(12) United States Patent
Connolly et al.

(10) Patent No.: US 9,292,467 B2
(45) Date of Patent: Mar. 22, 2016

(54) MOBILE RESOURCE ACCELERATOR

(75) Inventors: Jarrod Connolly, Vancouver (CA); Kent Alstad, Sechelt (CA)

(73) Assignee: Radware, Ltd., Tel Aviv (IL)

( * ) Notice: Subject to any disclaimer, the term of this patent is extended or adjusted under 35 U.S.C. 154(b) by 712 days.

(21) Appl. No.: 13/606,480

(22) Filed: Sep. 7, 2012

(65) Prior Publication Data

US 2013/0073609 A1  Mar. 21, 2013

Related U.S. Application Data

(60) Provisional application No. 61/535,924, filed on Sep. 16, 2011, provisional application No. 61/535,921, filed on Sep. 16, 2011.

(51) Int. Cl.
*G06F 15/16* (2006.01)
*H04L 29/08* (2006.01)
*H04L 29/00* (2006.01)
*H04N 21/00* (2011.01)
*G06F 17/30* (2006.01)

(52) U.S. Cl.
CPC .......... *G06F 15/16* (2013.01); *G06F 17/30902* (2013.01); *H04L 29/00* (2013.01); *H04L 67/00* (2013.01); *H04L 67/02* (2013.01); *H04L 67/2814* (2013.01); *H04L 67/2828* (2013.01); *H04L 67/2842* (2013.01); *H04N 21/00* (2013.01); *H04L 67/2871* (2013.01)

(58) Field of Classification Search
CPC ............ H04L 67/2842; H04L 67/2828; G06F 17/30902
USPC .......................................................... 709/203
See application file for complete search history.

(56) References Cited

U.S. PATENT DOCUMENTS

| 5,564,070 A | 10/1996 | Want |
| 5,784,562 A | 7/1998 | Diener |
| 6,038,601 A | 3/2000 | Lambert |

(Continued)

FOREIGN PATENT DOCUMENTS

| EP | 1480131 | 11/2004 |
| EP | 1492024 | 12/2004 |

(Continued)

OTHER PUBLICATIONS

International Search Report for International Patent Application No. PCT/IB2012/054654; Date of Mailing: Jan. 24, 2013.

(Continued)

*Primary Examiner* — Richard G Keehn
(74) *Attorney, Agent, or Firm* — M&B IP Analysts, LLC

(57) ABSTRACT

In a client/server environment wherein resources are returned in response to client requests, a resource can be in-lined the first time it is requested, and then cached locally for use in connection with subsequent requests. When a user returns to the page for a subsequent visit, the resource requests are served from the local cache, thus avoiding the need for re-transmission with each response. According to various embodiments, the system and method of the present invention can be implemented in connection with delivery of any content in a client/server system, including for example HTML responses to requests for web pages. In at least one embodiment, the techniques described herein are tailored to mobile data network constraints; however, these techniques can be applied to any data network.

39 Claims, 11 Drawing Sheets

(56) References Cited

U.S. PATENT DOCUMENTS

| | | |
|---|---|---|
| 6,370,687 B1 | 4/2002 | Shimura |
| 6,385,641 B1 | 5/2002 | Jiang et al. |
| 6,457,103 B1 | 9/2002 | Challenger et al. |
| 6,604,143 B1 | 8/2003 | Nagar |
| 6,618,751 B1 | 9/2003 | Challenger |
| 6,839,741 B1 | 1/2005 | Tsai |
| 7,043,460 B2 | 5/2006 | Deboer et al. |
| 7,096,418 B1 | 8/2006 | Singhal et al. |
| 7,139,780 B2 | 11/2006 | Lee et al. |
| 7,194,522 B1 | 3/2007 | Swildens et al. |
| 7,266,595 B1 | 9/2007 | Black et al. |
| 7,295,953 B2 | 11/2007 | Cox et al. |
| 7,392,294 B2 | 6/2008 | Hellstrom |
| 7,398,304 B2 | 7/2008 | Smith et al. |
| 7,469,280 B2 | 12/2008 | Simpson |
| 7,711,854 B2 | 5/2010 | Ecklund et al. |
| 7,865,585 B2 | 1/2011 | Samuels et al. |
| 7,886,218 B2 | 2/2011 | Watson |
| 7,895,256 B2 | 2/2011 | Zombek et al. |
| 8,001,175 B2 | 8/2011 | Betancourt et al. |
| 2002/0055966 A1* | 5/2002 | Border et al. ............... 709/200 |
| 2002/0065899 A1 | 5/2002 | Smith et al. |
| 2002/0156881 A1 | 10/2002 | Klopp Lemon et al. |
| 2003/0004937 A1 | 1/2003 | Salmenkaita et al. |
| 2003/0004998 A1 | 1/2003 | Datta |
| 2003/0040995 A1 | 2/2003 | Daddario et al. |
| 2003/0065810 A1 | 4/2003 | Ims et al. |
| 2003/0078964 A1 | 4/2003 | Parrella, Sr. et al. |
| 2003/0191812 A1 | 10/2003 | Agarwalla et al. |
| 2003/0204769 A1 | 10/2003 | Coughlin |
| 2003/0225897 A1 | 12/2003 | Krawetz |
| 2004/0043758 A1 | 3/2004 | Sorvari et al. |
| 2004/0068573 A1* | 4/2004 | Corbeil ....................... 709/229 |
| 2000/0117438 | 6/2004 | Considine |
| 2004/0205165 A1 | 10/2004 | Melamed et al. |
| 2004/0236824 A1 | 11/2004 | Millington et al. |
| 2004/0268357 A1 | 12/2004 | Joy |
| 2005/0033855 A1 | 2/2005 | Moradi et al. |
| 2005/0108335 A1 | 5/2005 | Naick et al. |
| 2005/0138033 A1 | 6/2005 | Katta |
| 2005/0188048 A1 | 8/2005 | Yuan et al. |
| 2005/0210243 A1 | 9/2005 | Archard |
| 2005/0261985 A1 | 11/2005 | Miller et al. |
| 2006/0015512 A1 | 1/2006 | Alon et al. |
| 2006/0095527 A1 | 5/2006 | Malik |
| 2006/0143290 A1 | 6/2006 | Dostert et al. |
| 2006/0212149 A1 | 9/2006 | Hicken et al. |
| 2006/0212601 A1 | 9/2006 | Hampton |
| 2006/0224723 A1 | 10/2006 | Chen |
| 2006/0225065 A1 | 10/2006 | Chandhok et al. |
| 2006/0235941 A1 | 10/2006 | Areas et al. |
| 2006/0294223 A1* | 12/2006 | Glasgow et al. .............. 709/224 |
| 2007/0005603 A1 | 1/2007 | Jain et al. |
| 2007/0033264 A1* | 2/2007 | Edge et al. ................... 709/217 |
| 2007/0130156 A1* | 6/2007 | Tenhunen et al. .............. 707/10 |
| 2007/0167182 A1* | 7/2007 | Tenhunen et al. ............. 455/512 |
| 2007/0174644 A1 | 7/2007 | Willig |
| 2007/0180035 A1 | 8/2007 | Liu et al. |
| 2007/0245409 A1* | 10/2007 | Harris et al. ...................... 726/5 |
| 2007/0260748 A1 | 11/2007 | Talkington |
| 2007/0268865 A1 | 11/2007 | Garcia et al. |
| 2007/0291741 A1 | 12/2007 | Hwang |
| 2008/0008109 A1 | 1/2008 | Ollis |
| 2008/0016240 A1 | 1/2008 | Balandin |
| 2008/0208789 A1 | 8/2008 | Almog |
| 2008/0208961 A1 | 8/2008 | Kim |
| 2009/0132658 A1 | 5/2009 | Glickstein |
| 2009/0254707 A1 | 10/2009 | Alstad |
| 2009/0270076 A1 | 10/2009 | Zhou et al. |
| 2009/0276488 A1 | 11/2009 | Alstad |
| 2010/0125649 A1 | 5/2010 | Day et al. |
| 2011/0041187 A1* | 2/2011 | Ikeda et al. ...................... 726/26 |
| 2011/0153807 A1 | 6/2011 | Vicisano et al. |
| 2011/0197144 A1* | 8/2011 | Coatta et al. ................... 715/749 |
| 2011/0277027 A1* | 11/2011 | Hayton et al. ..................... 726/8 |
| 2011/0295979 A1 | 12/2011 | Alstad et al. |
| 2014/0074629 A1* | 3/2014 | Rathod ....................... 705/14.73 |

FOREIGN PATENT DOCUMENTS

| | | |
|---|---|---|
| NZ | 566291 | 2/2008 |
| WO | 0178334 | 10/2001 |
| WO | 0186494 | 11/2001 |
| WO | 2007/009253 | 1/2007 |
| WO | 2011/116461 | 9/2011 |

OTHER PUBLICATIONS

Jung, Gueyoung, et al. "Generating Adaptation Policies for Multi-Tier Applications in Consolidated Server Environments", in Proceedings of the 5th IEEE International Conference on Automonic Computing, Jun. 2-6, 2008, pp. 23-32.

"Optimize caching", Aug. 26, 2009. Retrieved from: http://code.google.com/speed/page-speed/docs/caching.html.

"Seam Framework—HTTP client-server optimization strategies", Aug. 26, 2009. Retrieved from: http://seamframework.org/Documentation/HTTPClientserverOptimizationStrategies.

Xue Liu et al., "On-line Response Time Optimization of Apache Web Server", Proceedings of the 11th international conference on Quality of service, 2003, Springer-Verlag, pp. 461-478.

\* cited by examiner

MOBILE RESOURCE ACCELERATOR

CROSS-REFERENCE TO RELATED APPLICATIONS

The present application claims priority from U.S. Provisional Application Ser. No. 61/535,924 for "Mobile Resource Accelerator," filed Sep. 16, 2011, the disclosure of which is incorporated herein by reference.

The present application also claims priority from U.S. Provisional Application Ser. No. 61/535,921 for "Connection-Sensitive Resource Loader," filed Sep. 16, 2011, the disclosure of which is incorporated herein by reference.

The present application is related to U.S. Utility application Ser. No. 12/426,909 for "Extensible, Asynchronous, Centralized Analysis and Optimization of Server Responses to Client Requests", filed Apr. 20, 2009, the disclosure of which is incorporated herein by reference.

The present application is related to U.S. Utility application Ser. No. 13/051,887 for "Automated Optimization Based on Determination of Website Usage Scenario", filed Mar. 18, 2011, the disclosure of which is incorporated herein by reference.

The present application is related to U.S. Utility application Ser. No. 13/475,263 for "Optimized Rendering of Dynamic Content", filed May 18, 2012, the disclosure of which is incorporated herein by reference.

FIELD OF THE INVENTION

The present invention relates to mechanisms for optimizing performance and response time when presenting content in a client/server environment.

BACKGROUND

In networks with relatively slow connection speeds and high latencies (such as mobile networks), resource references embedded in HTML pages can take a long time to load. One method of reducing this time is to "in-line" the resources directly into the HTML text, for example by using data URIs with base-64 encoded text representing the digital bits of the resource. This is an effective method of removing or reducing latency associated with making additional requests. However, such a method may require the in-lined resources to be re-transmitted within the HTML text with every response. Thus, when a user returns to the page for a subsequent visit, the resources which were included with the previous response need to be included with the new response as well. Such retransmission of resources on multiple visits leads to inefficiencies and can adversely affect responsiveness and performance.

SUMMARY

According to various embodiments, the present invention implements a system and method by which a resource can be in-lined the first time it is requested, and then cached locally for use in connection with subsequent requests. According to various embodiments of the present invention, when the user returns to the page for a subsequent visit, the resource requests are served from the local cache, thus avoiding the need for re-transmission with each response.

According to various embodiments, the system and method of the present invention can be implemented in connection with delivery of any content in a client/server system, including for example HTML responses to requests for web pages. In at least one embodiment, the techniques described herein are tailored to mobile data network constraints; however, the techniques described herein can be applied to any data network.

In at least one embodiment, the system of the present invention includes an accelerator proxy that intercepts client requests before they are sent to servers for processing. Thus, the various steps described herein can be performed at such an accelerator proxy.

In at least one embodiment, the system of the present invention provides a seamless client-side cache solution that transfers items to the client cache by transporting them inside the client HTML as in-lined embedded resources. Once the page is rendered on the client browser, the resources are transferred into a local cache and subsequently referenced by a key that is stored at or by the server.

In at least one embodiment, a set of client groups is configured; these represent categories of web browser applications/devices that have similar APIs and feature sets. In one embodiment, web browsers are grouped together using a user-agent filter query.

Each web browser request is assigned a visitor context by the system. In at least one embodiment, the visitor context is maintained using an HTTP cookie, for example a cookie named "visitor". Based on the visitor context, each request is categorized into one of three categories: initial visit, repeat visit, and internal visit. The visitor cookie is used to infer the visit state and to track which pages within the site have likely been visited.

In at least one embodiment, before accelerating pages, the invention is primed, or warmed up. During this priming phase, the system tracks and samples external resource references embedded within HTML pages, tailors them for use by each client group, and stores the tailored versions where they can be retrieved and used in subsequent steps. In at least one embodiment, the creation of tailored resources may be executed off-line. During the priming phase, web browsers receive the original unaltered HTML responses and corresponding embedded resources.

Once the system is primed (i.e., a sufficient number of tailored resources have been created and mapped), the original HTML of web pages is rewritten to include appropriately in-lined versions of the resources as well as a script to cause the client to store (cache) resources locally to be used in response to future requests. In at least one embodiment, such rewriting is performed by the accelerator proxy, which inserts the resources and includes JavaScript into the HTML to cause the client to transfer the resources into local storage. An appropriate method of creating in-lined versions of the resources and logic for storing them locally is defined for each client group. This enables resources to be embedded in-line in HTML (thus eliminating the round-trip required to fetch the resource) and then to be transferred to local storage once the page has been rendered.

A map can be kept at the accelerator proxy that tracks which resources are common across pages, which resources are common by unique visitor, and which resources are used on which pages. This information, combined with the information in the visitor cookie (which indicates which pages/page groups have been visited), enables the system to infer the state of each resource in the client cache so that only resources that are not already likely to be on the client are in-lined within the HTML response. In this manner, the system and method of the present invention provide a mechanism for transporting external resources to their most optimal location in the network and then transforming the HTML to reference these resources from the new location.

In at least one embodiment, the method of the present invention is implemented in a system for presenting web-based content, such as web pages, to a user. One example of such a system is a client/server architecture in which software, such as a browser running on a client machine, requests content from a server, including HTML pages and/or other resources. The content is delivered over a communications network such as the Internet, using known communications protocols such as HTTP and TCP/IP. In at least one embodiment, an accelerator proxy and/or edge accelerator proxy intercept client requests for content and process such requests according to the techniques described herein.

In the examples and drawings presented herein, the present invention is described in connection with mechanisms for optimizing the delivery of web page content, as may be presented on a browser running on a client. However, one skilled in the art will recognize that the methods of the present invention can also be applied to other forms of optimization, including optimization of any suitable types of resources. In addition, one skilled in the art will recognize that the methods of the present invention can also be applied to systems using protocols other than HTTP, resource requests other than HTML web pages, and files of any format. In short, the techniques described herein can be applied to any suitable type of data or content delivered across any electronic network.

As mentioned above, the system of the present invention can be implemented using a network appliance (also referred to as an accelerator or accelerator proxy) that intercepts and processes client requests before they reach the server. Such an appliance can be located, for example, in a data path between the server and the client. Such an appliance can be incorporated in a hardware device such as a router, or it can be a standalone device. Alternatively, the system of the present invention can be implemented by software running at the client and/or server, or any combination thereof.

In at least one embodiment, the present invention can be combined with other optimization techniques, such as those described in the following related applications:

U.S. Utility application Ser. No. 12/187,233 for "Partial Content Caching," filed Aug. 6, 2008;
U.S. Utility application Ser. No. 12/426,909 for "Extensible, Asynchronous, Centralized Analysis and Optimization of Server Responses to Client Requests," filed Apr. 20, 2009;
U.S. Utility application Ser. No. 13/110,524 for "Accelerating HTTP Responses in a Client/Server Environment," filed May 18, 2011;
U.S. Utility application Ser. No. 13/357,624 for "Image Optimization," filed Jan. 25, 2012; and/or
U.S. Utility application Ser. No. 13/475,263 for "Optimized Rendering of Dynamic Content," filed May 18, 2012.

The disclosures of the above-listed related applications are incorporated herein by reference.

In at least one embodiment, the present invention can be combined with or can build upon existing optimization technologies such as those described above, including but not limited to ESI, Partial Page Caching, and/or third party libraries such as ControlJS and HeadJS.

One skilled in the art will recognize that the optimization techniques described herein can be applied to other scenarios and conditions, and are not limited to the specific examples discussed herein.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention. In particular, the sequence diagrams provided herein are intended to show an example of a particular sequence of events that can be used to implement the invention. One skilled in the art will recognize, however, that the events can take place in a different sequence, and/or that some events can be omitted and/or others added, without departing from the essential characteristics of the invention as set forth in the claims.

DETAILED DESCRIPTION OF THE EMBODIMENTS

System Architecture

Figure 1A:
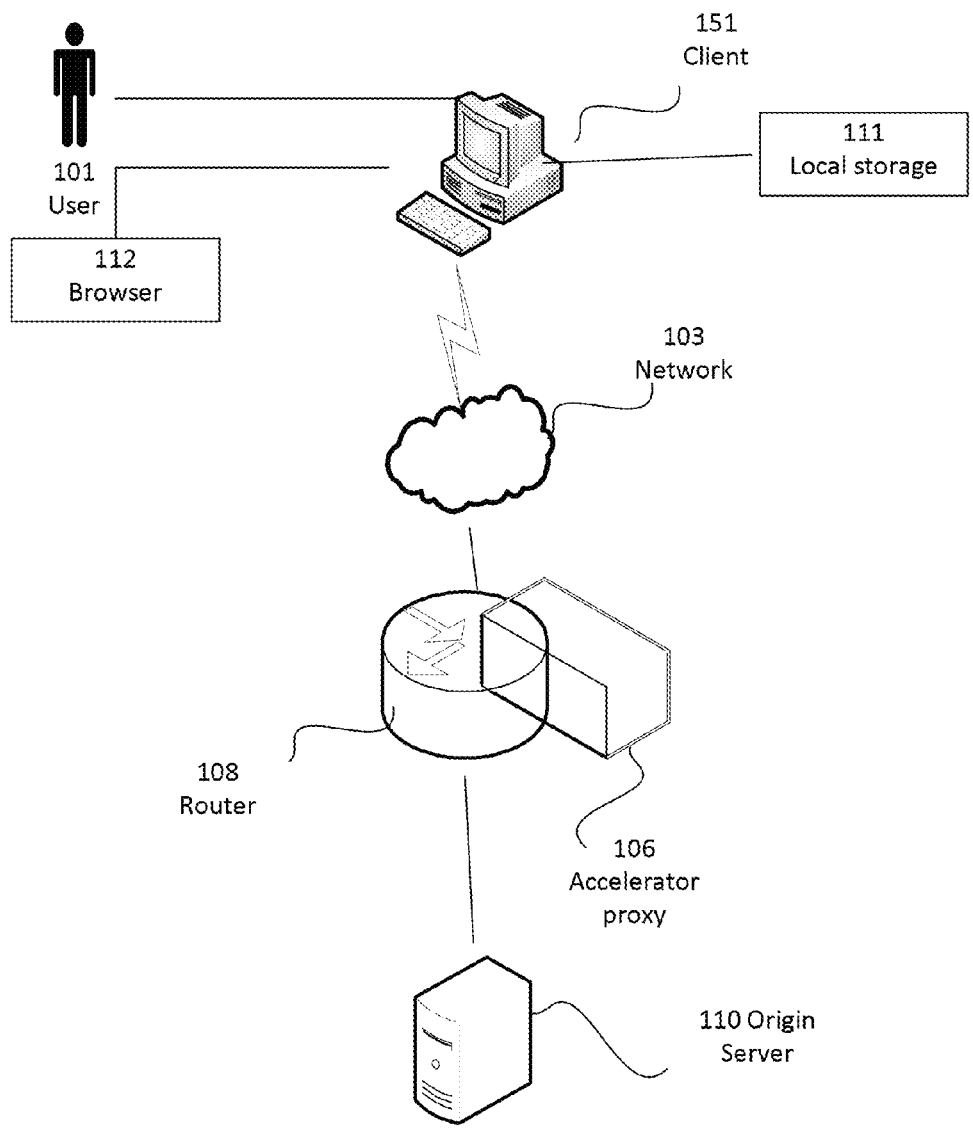
FIG. 1A depicts an architecture for practicing the present invention according to one embodiment, wherein an accelerator proxy for optimizing performance and response time resides in a network device such as a router.

Referring now to FIG. 1A, there is shown an architecture for practicing the present invention according to one embodiment, wherein an accelerator proxy 106 (also referred to as an optimizer) for performing the techniques of the present invention resides in a network device such as router 108. As depicted in FIG. 1A, in such a configuration, accelerator proxy 106 is positioned between origin server 110 (also referred to as server 110) and client machine 151. Origin server 110 may be an HTTP server, web server, or other server; client 151 may be an HTTP client or any other electronic device capable of sending and receiving messages on network 103. Network 103 may be the Internet or any other network that enables communication among two or more electronic devices. Network 103 may be implemented using well-known network protocols such as Hypertext Transfer Protocol (HTTP), Secure Hypertext Transfer Protocol (SHTTP), Transmission Control Protocol/Internet Protocol (TCP/IP), and/or the like. In some embodiments, secure access to network 103 may be facilitated via well known techniques such as a Virtual Private Network (VPN), although such secure access is not required.

Client 151 and/or origin server 110 may be computers or any other electronic devices. Examples include, without limitation, a desktop computer, laptop computer, personal digital assistant (PDA), cellular telephone, smartphone, music player, handheld computer, tablet computer, kiosk, game system, enterprise computing system, server computer, or the like. In at least one embodiment, client 151 and/or origin server 110 are desktop computers running an operating system such as for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google Inc. of Mountain View, Calif.; and/or any other operating system that is adapted for use on such devices.

In at least one embodiment, client 151 and/or origin server 110 each include a number of hardware components as are well known to those skilled in the art, including for example one or more input devices (such as a keyboard, mouse, touchscreen, trackball, trackpad, five-way switch, voice input device, joystick, and/or any combination thereof), one or more output devices (such as a screen, speaker, printer, and/or any combination thereof), one or more processors (which can be a conventional microprocessor for performing operations on data under the direction of software, according to well-known techniques), memory (such as random-access memory having a structure and architecture as are known in the art, for use by the one or more processors in the course of running software), and/or local storage (which can be any magnetic, optical, and/or electrical storage device for storage of data in digital form, such as flash memory, magnetic hard drive, CD-ROM, and/or the like). Such components are well known in the art of computing architecture and are thus omitted from FIG. 1A for clarity.

One skilled in the art will recognize that the particular arrangement of hardware elements shown in FIG. 1A is merely exemplary, and that the invention can be implemented using different hardware elements configured in any of a number of different ways. Thus, the particular architecture shown in FIG. 1A is merely illustrative and is not intended to limit the scope of the invention in any way.

One skilled in the art will recognize that any number of devices, singly or in any combination, may be configured to fulfill the roles of client 151 and/or origin server 110 described herein without departing from the scope of the present invention.

Client 151 may run web browser 112 and/or another software application for enabling network communications and for presenting content, such as web pages including resources, to user 101.

Local storage 111 may be a cache or other storage mechanism available to client 151. In at least one embodiment, local storage 111 can be implemented as a list of key/value pairs with an access API provided by browser 112. In at least one embodiment, size constraints and cache expiry are managed by accelerator proxy 106. In particular situations where the size of available local storage 111 is limited, accelerator proxy 106 and/or other components of the system monitor and measure the size of the resources placed into local storage 111 and can use such information to implement a cache expiry algorithm.

For example, in at least one embodiment, metadata stored in local storage 111 describes each stored resource; such metadata can be used by accelerator proxy 106 and/or other components to maintain the freshest and most optimal set of resources given the available space in local storage 111. In at least one embodiment, the metadata contains a resource use count that tracks how often the resource has been accessed; such data can be used to facilitate least-frequently-used (LFU)-based cache expiry. In at least one embodiment, the metadata contains a timestamp that indicates the time the resource was added (and/or updated), so as to facilitate least-recently-used (LRU)-based cache expiry. The timestamp may also be an expiry timestamp based, for example, on heuristics and/or cache headers associated with the resource. One skilled in the art will recognize that other cache management techniques can be used and applied to local storage 111, and that any such techniques can be used singly or in combination with one another. One skilled in the art will recognize that the particular type of cache management used may depend on system configuration.

As described herein, user 101 may be an administrator or an end user. In at least one embodiment, client 151 operates under the direction and control of user 101, who interacts with browser 112 running on client 151 via a user interface according to well-known techniques. Browser 112 communicates over network 103 with acceleratory proxy 106; accelerator proxy 106 in turn communicates over network 103 with origin server 110, which serves the requested content. In at least one embodiment, accelerator proxy 106 intercepts requests transmitted by browser 112 and addressed to origin server 110.

Network 103 may be any suitable electronic communications network, such as for example the Internet, a wide-area network (WAN), a local-area network (LAN), wireless network, WiFi network, cellular network, mobile network, radio network, or any other type of network, as well as any suitable combination thereof. Network 103 may include one or more routers, switches, gateways, application delivery controllers (ADCs), and other network devices.

For illustrative purposes, the invention is described herein in terms of requesting, receiving, and rendering web pages at browser 112 running on client 151.

In at least one embodiment, router 108 is implemented as a computing device configured to route network traffic between client 151 and origin server 110 according to well known mechanisms. Router 108 may include optimization and acceleration components as described in related U.S. Utility application Ser. No. 12/426,909 for "Extensible, Asynchronous, Centralized Analysis and Optimization of Server Responses to Client Requests," filed Apr. 20, 2009, the disclosure of which is incorporated herein by reference. Such components may include, for example, accelerator proxy 106 as described in the related application.

In at least one embodiment, accelerator proxy 106 can be implemented as a software-based component of router 108. Accordingly, router 108 may include a processor (not shown) for performing the techniques of the present invention in accordance with software and/or firmware instructions.

Figure 1B:
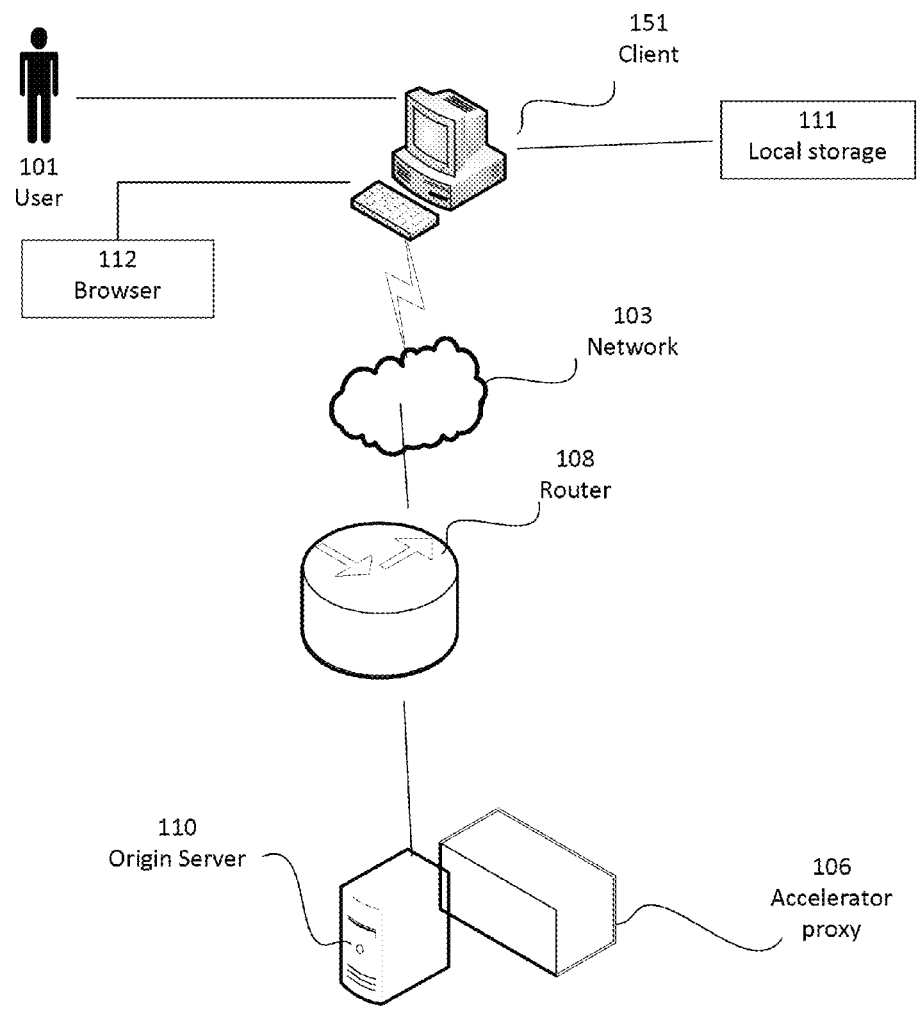
FIG. 1B depicts an architecture for practicing the present invention according to one embodiment, wherein an accelerator proxy for optimizing performance and response time resides in a server.

Referring now to FIG. 1B, there is shown an architecture for practicing the present invention according to another embodiment, wherein accelerator proxy 106 resides in origin server 110. One skilled in the art will recognize that the techniques of the present invention can be implemented in an accelerator proxy 106 or other component having any suitable location within the overall network architecture, and that the particular arrangements shown in FIGS. 1A and 1B are merely exemplary. For example, accelerator proxy 106 can be implemented as part of a stand-alone network appliance located in the communication path between client 151 and origin server 110. Accelerator proxy 106 can also be implemented using any number of network appliances and/or other components in any suitable combination.

Figure 1C:
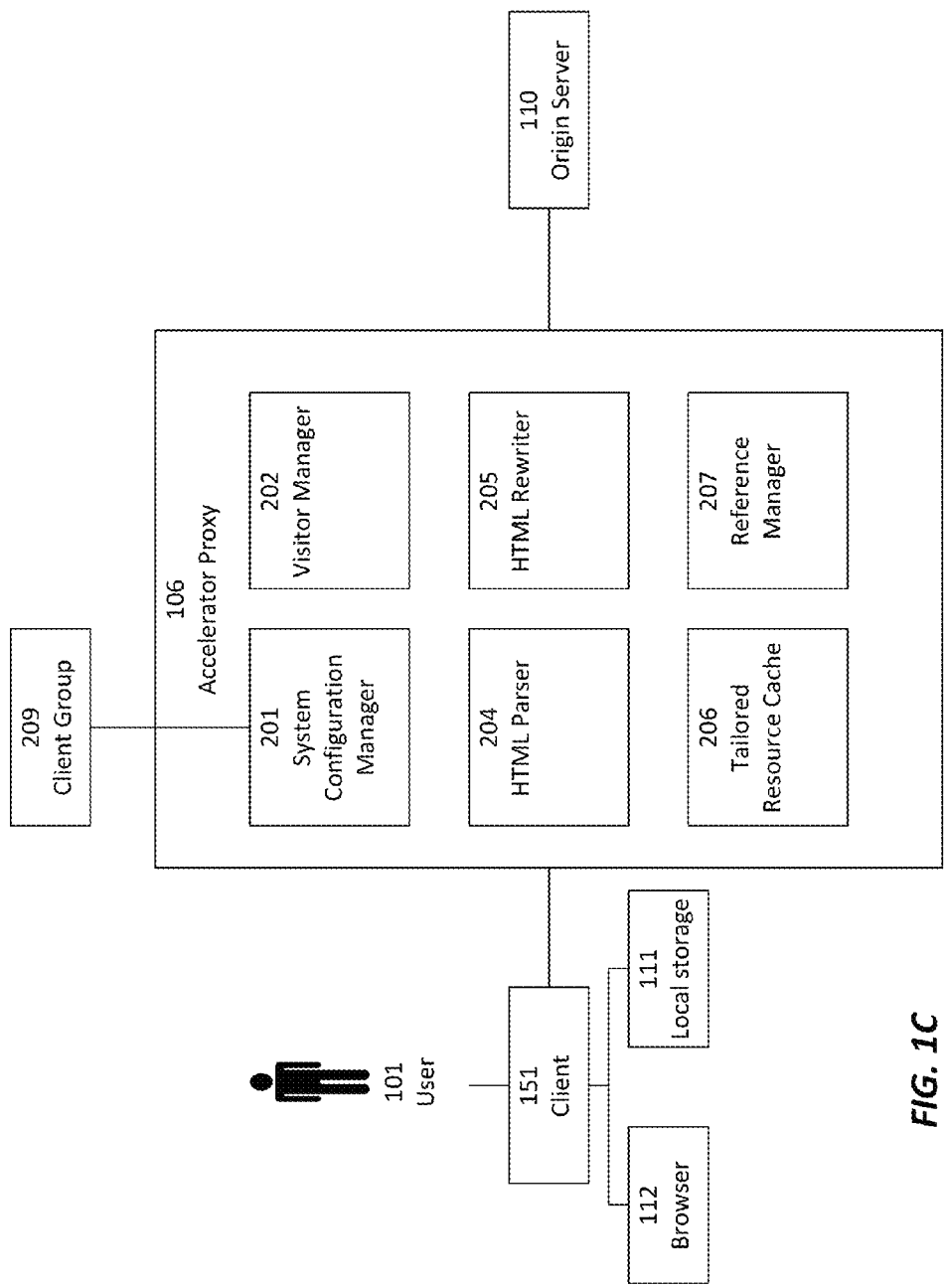
FIG. 1C is a block diagram depicting a conceptual architecture for implementing the present invention according to one embodiment.

Referring now to FIG. 1C, there is shown a block diagram depicting a conceptual architecture for implementing the present invention according to one embodiment. The depicted architecture is merely exemplary; the system of the present invention can be implemented using any number of software and/or hardware components in any suitable configuration.

Client 151 can be any conventional computing system or machine, or any other electronic device capable of displaying content on an output device such as a display screen. Client 151 can run browser software 112 for presenting such content, such as web pages including static and dynamic content received from origin server 110 in response to requests. Browser 112 can be any conventional browser, such as for example Microsoft Internet Explorer, available from Microsoft Corporation of Redmond, Wash.; Chrome, available from Google, Inc. of Mountain View, Calif.; Firefox, available from Mozilla Corporation of Mountain View, Calif.; or Safari, available from Apple Inc. of Cupertino, Calif.

Origin server 110 may be a web server or any other type of server, such as an HTTP server capable of receiving requests via HTTP and returning content in response to such requests.

User 101 interacts with client 151, for example by typing URLs and clicking on links within browser software 112. In response to such actions, browser 112 requests web pages, images, and other resources from origin server 110. Such requests can be transmitted via an electronic network such as the Internet, although any suitable wired and/or wireless network can be used.

Accelerator proxy 106 acts as an intermediary which performs operations such as intercepting client 151 requests for content, and modifying content (such as web pages in the form of HTML code) obtained from origin server 110 before such content reaches client 151. Accelerator proxy 106 can be implemented as any other suitable device, such as an HTTP proxy capable of parsing and rewriting HTML responses. Such a proxy can be implemented, for example in a network appliance capable of intercepting and/or relaying requests, responses, and/or other messages traveling between origin server 110 and client 151. In at least one embodiment, client 151, origin server 110, and accelerator proxy 106 communicate with one another via an electronic network such as the Internet, although any suitable wired and/or wireless network can be used.

In at least one embodiment, accelerator proxy 106 intercepts and forwards client 151 requests that are addressed to origin server 110, and processes such requests according to various techniques described herein. More particularly, in at least one embodiment, accelerator proxy 106 selectively serves tailored resources and/or resource keys to a requesting browser 112, as described in more detail below. Such a method is particularly effective on resources that are common across browser sessions or are used repeatedly by the same browser 112 during the same visit.

In at least one embodiment, accelerator proxy 106 includes several components, as follows:

System configuration manager 201: provides data storage and retrieval for global system data used by the system of the present invention. In at least one embodiment, system configuration manager 201 configures and manages client groups 209.

Visitor manager 202: detects the context (initial, repeat, internal) of each web browser connection.

HTML parser 204: separates the origin server 110 HTML response stream into tokens that can be matched and rewritten by HTML rewriter 205.

HTML rewriter 205: rewrites HTML responses to include resources and/or resource keys; also referred to as "grooming".

Tailored resource cache 206: a data store used to persistently store tailored resources (URL and contents) for use by the system.

Reference manager 207: resolves URL resource references found while parsing the HTML tokens with entries in tailored resource cache 206. This enables HTML rewriter 205 to rewrite each HTML token to include tailored content resources and/or keys appropriate for a particular client group 209.

The above-described components can be implemented using any combination of hardware, firmware, and software. For example, the components may be implemented as software modules for controlling the operation of a processor in accelerator proxy 106. Although the components are depicted in FIG. 1C as being part of accelerator proxy 106, some or all of them can be implemented in any suitable location, including for example a network appliance, accelerator, accelerator proxy 106, origin server 110, router 108, client 151, or any combination thereof.

Further description of the components of FIG. 1C is provided below.

Method

Figure 2:
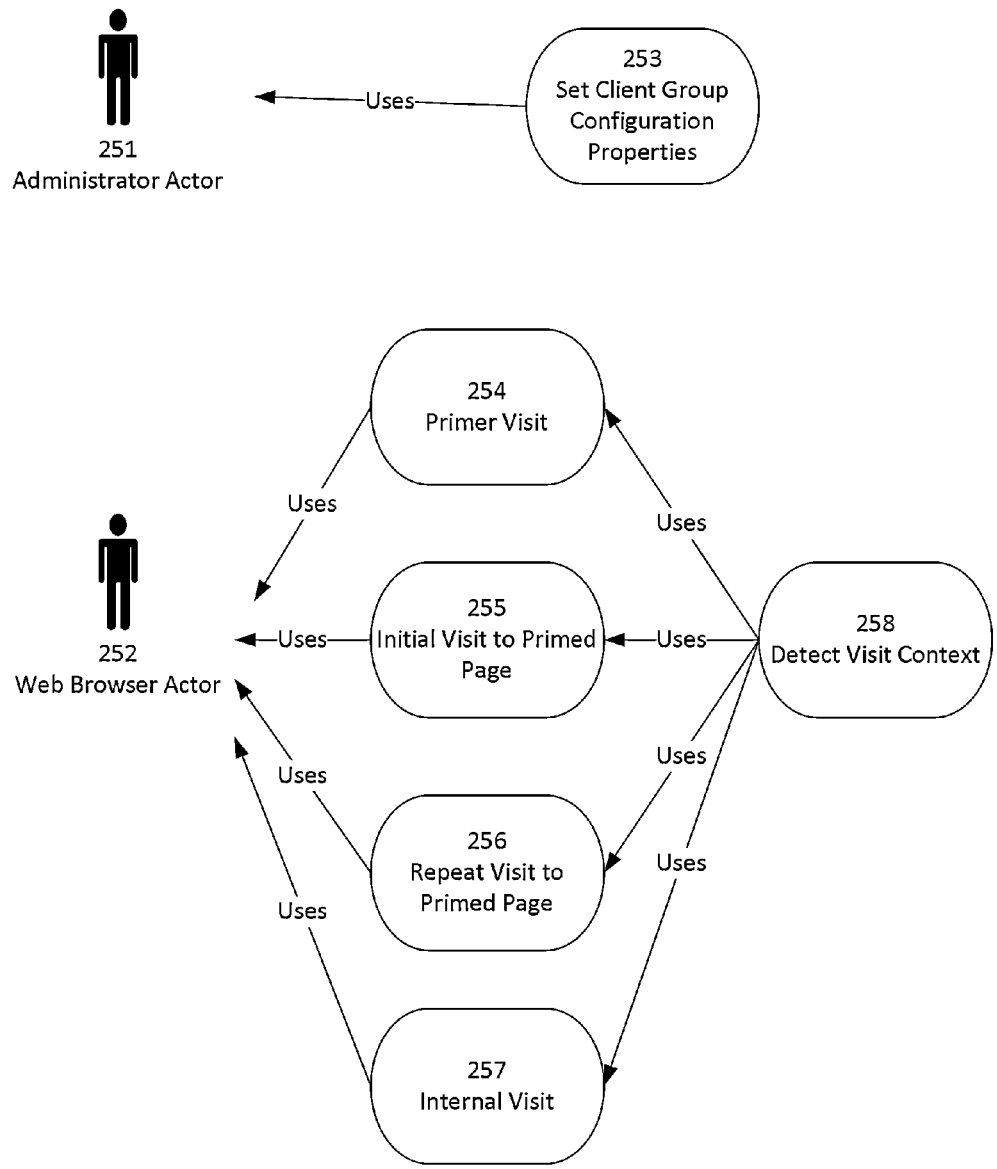
FIG. 2 is a flow diagram depicting a set of use cases for the present invention according to one embodiment.

Referring now to FIG. 2, there is shown flow diagram depicting a set of use cases for the present invention according to one embodiment. Administrator actor 251 is a type of user 101 who is responsible for administering the operation of the system. Accordingly, one use case for the system is that administrator actor 251 can set 253 client group configuration properties, as described in more detail herein.

Web browser actor 252 is a type of user 101 who interacts with the system of the present invention to view content via browser 112 in the normal course of operation. In at least one embodiment, the system of the present invention detects 258 a visit context, or state, for each such interaction, and directs operation in accordance with the detected context. In one embodiment, an HTTP cookie is used to maintain and detect the required visitor state. One skilled in the art will understand, however, that other mechanisms for state management can be used.

In at least one embodiment, upon receipt or interception of a request at accelerator proxy 106, the context or state of the browser visit is detected. In response to the detected context, any of several use cases may be applicable for web browser actor 252, including for example:

Primer visit 254: during a primer visit 254, also referred to as a "warm-up" visit, the system tracks and samples external resource references embedded within HTML pages, tailors them for use by each client group 209, and stores the tailored versions where they can be retrieved and used in subsequent steps.

Initial visit to primed page 255: this use case represents an initial visit, such as when no visitor cookie is detected.

Repeat visit to primed page 256: this use case represents a situation where the visitor has already been to this page before; this may be detected, for example, based on the contents of a visitor cookie.

Internal visit 257: this use case represents a situation where the visitor has been to the website, but not to this particular page; again, this may be detected, for example, based on the contents of a visitor cookie.

In at least one embodiment, in addition to detecting the visit context, the system can also determine which client group 209 the requesting browser 112 belongs to. In one embodiment, this is accomplished by testing user-agent text included in the request headers against the set of filters associated with each client group 209. In one embodiment, a regular expression pattern evaluator (not shown) can be used to implement this filter.

In at least one embodiment, accelerator proxy 106 serves tailored resources to a requesting browser 112. Accelerator proxy 106 selects the best application of the tailored resources based on the requesting visit context. Such a method is particularly effective on resources that are common across browser sessions (i.e., instances) and/or are used repeatedly by the same browser 112 during the same visit. For illustrative purposes, the invention is depicted and described in terms of its operation on resources that are found on the same page for all browser sessions or that occur across pages for a single browser session.

In one embodiment, there are three transformation scenarios—one for each visit context, as will be described in more detail herein. Different visit scenarios specify different ways in which externally referenced resources are transformed. In one embodiment, such transformation can be applied to the treatment of resource contents and/or local storage behavior. More specifically, resource contents can be either in-lined or left as external references, and each resource can be flagged for transfer to local storage or not. When a resource is flagged for transfer to local storage, a local storage key is included that can be used as a lookup key for future requests.

For illustrative purposes, the method of the invention is described herein in terms of three phases: a configuration phase, a priming (warm-up) phase, and an acceleration phase. In at least one embodiment, however, these phases can overlap one another. For example, while one page is in the priming phase, another may be in the acceleration phase. Although, in general, configuration is performed first, changes to system configuration can take place at any time, causing the system to alter its behavior.

Configuration Phase 253

During the configuration (or setup) phase, administrator actor 251 can optionally set 253 and/or change default configuration of client group properties, so as to group clients 151 with similar characteristics and configure parameters determining how resource tailoring shall take place. Client group configuration allows the system to function even when different browsers 112 at different clients 151 have different constraints with regard to cache, application programming interface (API), size, performance, and the like.

In at least one embodiment, each client group 209 is a set of clients 151 (or browsers 112) that has at least some common features and behaviors, such that a single approach for resource tailoring applies to all members of the group 209.

In at least one embodiment, client group 209 membership is defined by a filter query associated with each group 209 that is applied to the web browser user-agent request header. This header uniquely defines each class of browser 112 and can be used for this purpose. In other embodiments, another header or method can be used.

In addition to the filter query that defines group membership, in at least one embodiment each client group 209 can include properties that constrain the size of resources that can be treated during the course of operating the system.

Configuration phase 253 is optional; for example, in at least one embodiment, configuration settings only need to be changed when the capabilities of a browser 112 change or when administrator actor 251 wants to tailor the size limits and filtering for specific site characteristics.

Figure 3:
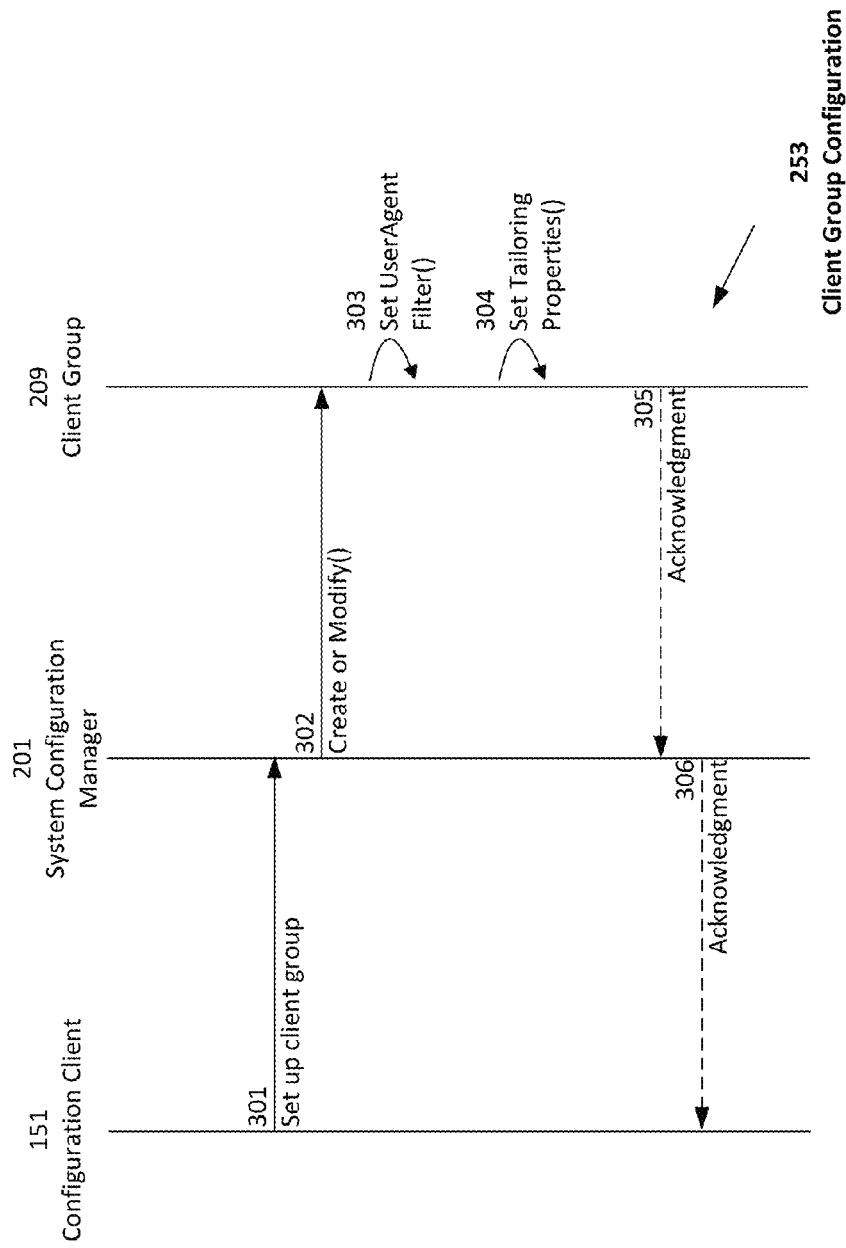
FIG. 3 is a sequence diagram depicting a method of performing client group configuration according to one embodiment.

Referring now to FIG. 3, there is shown a sequence diagram depicting a method of performing client group configuration 253 according to one embodiment. Client 151 may be a designated client 151 for performing configuration 253, or it may be any ordinary client 151. In at least one embodiment, client 151 is operated by administrator actor 251, who is a user 101 that is authorized to make changes to system configuration. Under the direction of administrator actor 251, client 151 issues a setup client group message 301 to system configuration manager 201 running at accelerator proxy 106. In response to receiving message 301, system configuration manager 201 sends a message 302 to create or modify one or more client group(s) 209. In at least one embodiment, client group 209 configuration data is stored at data storage accessible by accelerator proxy 106, although such information can be stored at any suitable location. In at least one embodiment, client group 209 is implemented as a method, which, in response to receiving create or modify message 302 from system configuration manager 201, performs operations to establish or change a user-agent filter 303 defining client group 209 and to establish or change tailoring properties 304 associated with client group 209. Once such operations are completed, client group 209 transmits an acknowledgment message 305 to system configuration manager 201. In turn, system configuration manager 201 transmits an acknowledgment message 306 to client 151.

Primer (Warm-Up) Phase

During the primer (warm-up) phase (also referred to as a "warm-up" phase), any number of primer visits 254 can take place. The system tracks and samples external resource references embedded within HTML pages, tailors them for use by each client group 209, and stores the tailored versions in tailored resource cache 206, where they can be retrieved and used in future steps. Some examples of resource tailoring include resizing images, "minifying" CSS and JavaScript (removing non-essential characters), and converting to base-64 encoding (required for binary resources in-lined within HTML). In at least one embodiment, each page on a site goes through a primer phase in which all the resources are discovered and common resources are identified, tailored, and stored by the system. In at least one embodiment, each page starts by being primed, and then can be accelerated for subsequent responses.

Figure 4:
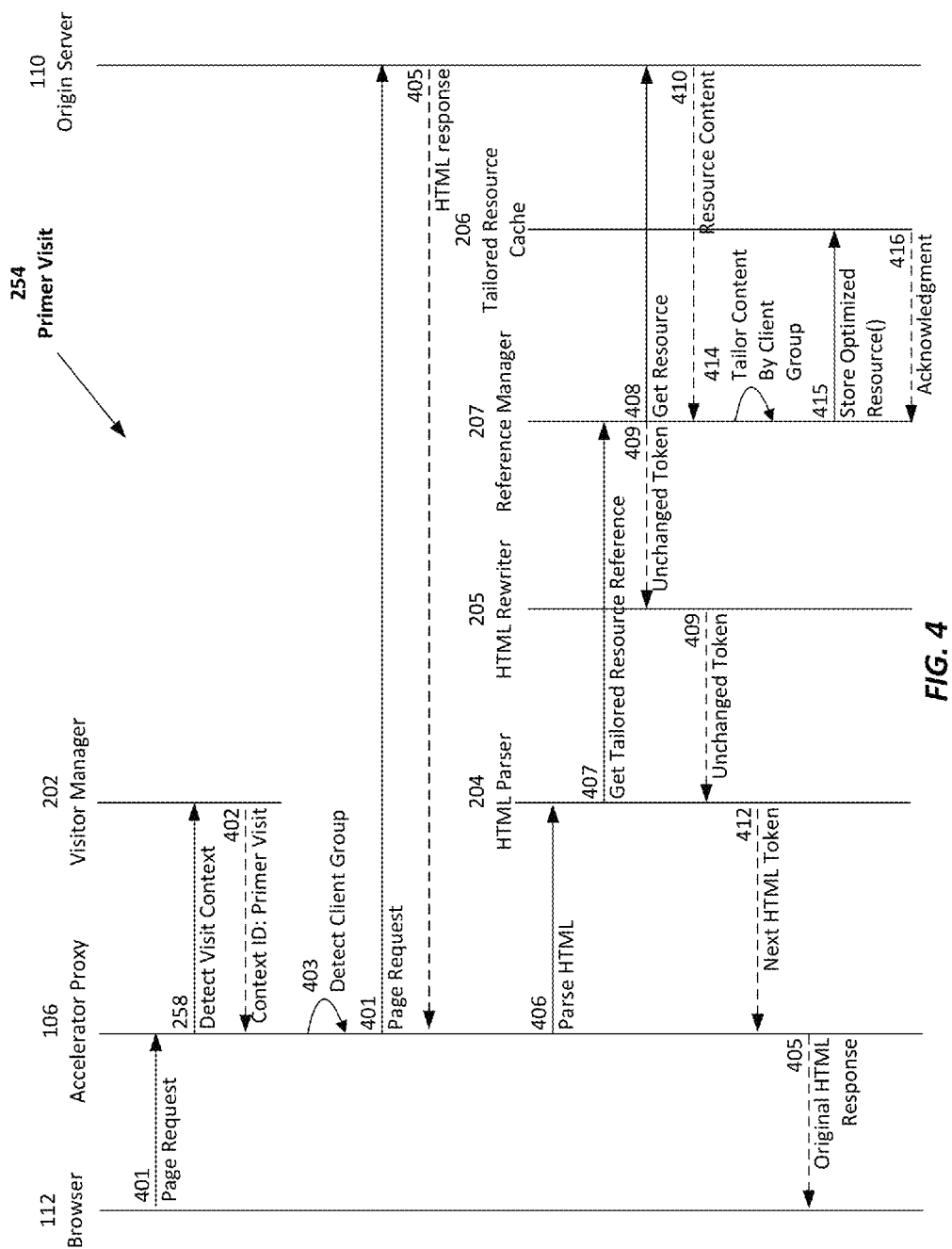
FIG. 4 is a sequence diagram depicting a primer visit according to one embodiment.

Referring now to FIG. 4, there is shown a sequence diagram depicting a primer visit according to one embodiment.

Browser 112 issues a page request 401 (such as a request for an HTML page, transmitted via HTTP). Page request 401 is intercepted by accelerator proxy 106. Accelerator proxy 106 issues a detect visit context call 258 to visitor manager 202, which determines the visit context. Visitor manager issues a response including a context ID 402 indicating that the visit is a primer visit. Further description of the process for determining the visit context is provided herein in connection with FIG. 8.

If appropriate, accelerator proxy 106 also detects 403 the client group 209 associated with page request 401, for example by testing user-agent text included in the request headers.

Accelerator proxy 106 then forwards page request 401 to origin server 110, which in turn provides a response, such as HTML response 405 containing a web page and/or other resources. Prior to forwarding HTML response 405 to browser 112, accelerator proxy 106 issues a parse HTML call 406 to HTML parser 204 to separate HTML response 405 into tokens that contain external resource references. For each such token, HTML parser 204 sends a message 407 to reference manager 207 to obtain a tailored resource reference. Reference manager 207 processes the external resource reference by requesting 408 and receiving the resource content 410 from its original location (such as origin server 110), tailoring 414 the content for each client group 209 as appropriate, and then storing 415 each tailored (optimized) version of the resource in tailored resource cache 206 or in some other suitable storage location. Tailored resource cache 206 responds with an acknowledgment 416.

In at least one embodiment, reference manager 207 maps the URL (key) for each resource with its corresponding contents as well as a record of some or all the parent page URLs that refer to the resource. This information is used for detecting resource contexts, as described in more detail in connection with FIG. 9.

Reference manager 207 transmits the HTML token 409 back to HTML rewriter 205, which forwards it to HTML parser 204. If additional resources are to be processed, HTML parser requests the next HTML token 412 from accelerator proxy 106 for further processing.

In at least one embodiment, detection and processing of resources during the primer visit takes place independently of transmission of HTML response 405 from origin server 110 to browser 112. Accordingly, as shown in FIG. 4, accelerator proxy 106 forwards original HTML response 405 to browser 112, without any changes. Thus, browser 112 is minimally affected by optimization operations during this primer (warm-up) phase.

Acceleration Phase

Once a page has been primed and all common resources have been prepared for use, future requests for that page can be accelerated using the techniques described herein.

In at least one embodiment, an HTTP cookie is used to maintain the visitor state. Accelerator proxy 106 detects and interprets the cookie according to well known mechanisms, so as to determine the current visitor state, or visit context. One skilled in the art will recognize that other mechanisms for state management can be used.

When accelerator proxy 106 receives or intercepts a request, it detects the context of the web browser visit. Each request is flagged as one of the following:
  Initial visit: there is no indication that the visitor has previously visiting this web page or website;
  Repeat visit: the visitor has already been to this web page;
  Internal visit: the visitor has been to the website, but not to this particular web page.

In one embodiment, the repeat visit and/or internal visit is detected by the presence of a cookie containing a hash ID indicating that the visitor has already been to the same page or other page(s) in the same website. The initial visit is detected by absence of a relevant cookie.

In addition to detecting the visit context, in at least one embodiment the system also detects which client group 209 the requesting client 151 (or web browser 112) belongs to. In at least one embodiment, this is accomplished by testing user-agent text included in the request headers against a set of filters associated with each client group 209. In at least one embodiment, a regular expression pattern evaluator can be used to implement this filter.

Accelerator proxy 106 selects the best application of the tailored resources based on the requesting visit context. In at least one embodiment, there are three transformation scenarios—one for each visit context. Different visit scenarios specify different ways in which the externally referenced resources are transformed. In at least one embodiment, such transformation can be applied to the treatment of resource contents and/or local storage behavior. More specifically, resource contents can be either in-lined or left as external references, and each resource can be flagged for transfer to local storage or not. When a resource is flagged for transfer to local storage, a local storage key is included that can be used as a look-up key for future requests.

In at least one embodiment, a set of text size constraints (and/or other types of constraints) is established. In this manner, the system of the present invention can be configured, for example, only to operate on resources that fall within the defined constraints; resources that exceed these constraints are left unchanged. Such constraints can be established on a client group by client group basis.

Initial Visit.

In initial visit scenario 255, all of the external resources within the client group "in-line text" size constraints that are referenced in one of the HTML tokens are transformed (rewritten) such that the data is placed in-line as text within the document and flagged for transfer to local storage 111 associated with browser 112 at client 151. External resource references that are referenced in one of the HTML tokens, and that do not fit the in-line text size constraints but do fit within the client group "store local" size constraints are transformed (rewritten) such that they are left as external references but are flagged for transfer to local storage 111. Other resources whose characteristics fall outside of the client group constraints are left unchanged.

Figure 5:
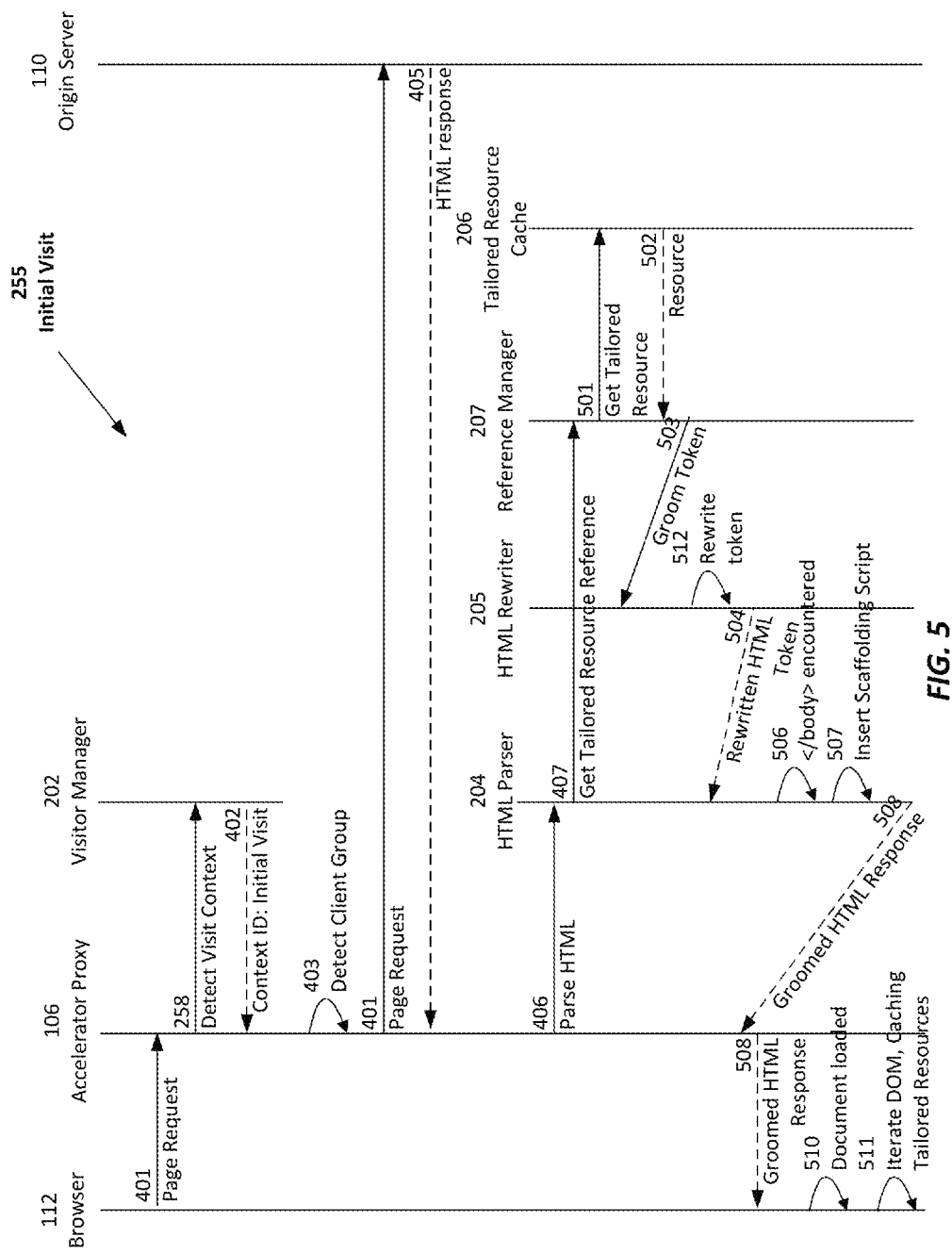
FIG. 5 is a sequence diagram depicting an initial visit to a primed page according to one embodiment.

Referring now to FIG. 5, there is shown a sequence diagram depicting an initial visit to a primed page 255 according to one embodiment. The steps illustrated in FIG. 5 are performed, for example, once a sufficient number of primer visits required to warm up the system have been completed, and the system has been primed for the request being described.

Browser 112 issues a page request 401 (such as a request for an HTML page, transmitted via HTTP), representing the first time an instance of browser 112 has requested a particular web page. Page request 401 is intercepted by accelerator proxy 106. Accelerator proxy 106 issues a detect visit context call 258 to visitor manager 202, which determines the visit context. Visitor manager issues a response including a context ID 402 indicating that the visit is an initial visit. Further description of the process for determining the visit context is provided herein in connection with FIG. 8.

If appropriate, accelerator proxy 106 also detects 403 the client group 209 associated with page request 401, for example by testing user-agent text included in the request headers.

Accelerator proxy 106 then forwards page request 401 to origin server 110, which in turn provides a response, such as HTML response 405 containing a web page and/or other resources. Accelerator proxy 106 issues a parse HTML call 406 to HTML parser 204 to separate HTML response 405 into tokens that contain external resource references. For each such token, HTML parser 204 sends a message 407 to reference manager 207 to obtain a tailored resource reference. Reference manager 207 requests 501 and receives 502 a tailored resource from tailored resource cache 206.

Tokens may contain external resource references. For each such token, reference manager 207 transmits a groom token call 503 to HTML rewriter 205; HTML rewriter 205 rewrites 512 the token to include an in-lined resource and URL key for local storage of the resource at client 151. HTML rewriter 205 transmits the rewritten token 504 to HTML parser 204.

In the case of an initial visit, reference manager 207 instructs HTML rewriter 205 to replace some or all of the original resource locations with in-line version(s) of the resource(s) that can be included directly in the HTML (for example as a Data URI or in-line script), including a key (such as the original resource URL). In at least one embodiment, this in-lining transformation only takes place for resources within the size constraints defined by client group 209.

In at least one embodiment, rewriting 512 is repeated for all tokens in the HTML document. In at least one embodiment, HTML parser 204 determines when all tokens have been processed by detection of a </body> token, indicating that the end of the HTML body has been reached. At this point, a script is inserted 507 that is configured to execute after the page has loaded (or performed its foreground processes); this script is referred to herein as a scaffolding script. The purpose of the scaffolding script is to cause client 151 to transfer the contents of the in-lined resources to local storage 111 for future use. In at least one embodiment, the key for each resource stored locally is included with the in-line data and is known by reference manager 207. One skilled in the art will recognize that the timing of the execution of the scaffolding script is not critical to the operation of the present invention, and that execution can be triggered at other times without departing from the essential characteristics of the present invention.

Once the scaffolding script has been inserted 507, HTML parser 204 provides the resulting groomed HTML response 508 to accelerator proxy 106, which transmits it to browser 112. Browser 112 recognizes that the document has been loaded 510. In at least one embodiment, in addition to rendering the HTML page, browser 112 iterates 511 through the domain object model (DOM) specified in the HTML response 508 and stores the tailored resources found therein in local storage 111 for future use. In at least one embodiment, the resources are stored using the local storage key discussed above. The relevant metadata for managing the cache, including cache expiry, is also stored or updated.

Repeat Visit.

In repeat visit scenario 256, web browser 112 returns to the exact same page that has already been viewed; repeat visit scenario 256 may also apply when the page issues a PostBack request. In such a situation, the logic used to detect the state of each individual resource reference can be bypassed, and the system can assume that all of the external resource references that have been flagged for transfer to local storage have been stored in local storage 111 at client 151 and are available for use. In at least one embodiment, resources previously flagged for local storage 111 are transformed to a short-form syntax that instructs the browser 112 to load the resource contents from local storage 111 using the specified key as a look-up parameter. Resources whose characteristics fall outside of the client group constraints are left unchanged.

Figure 6:
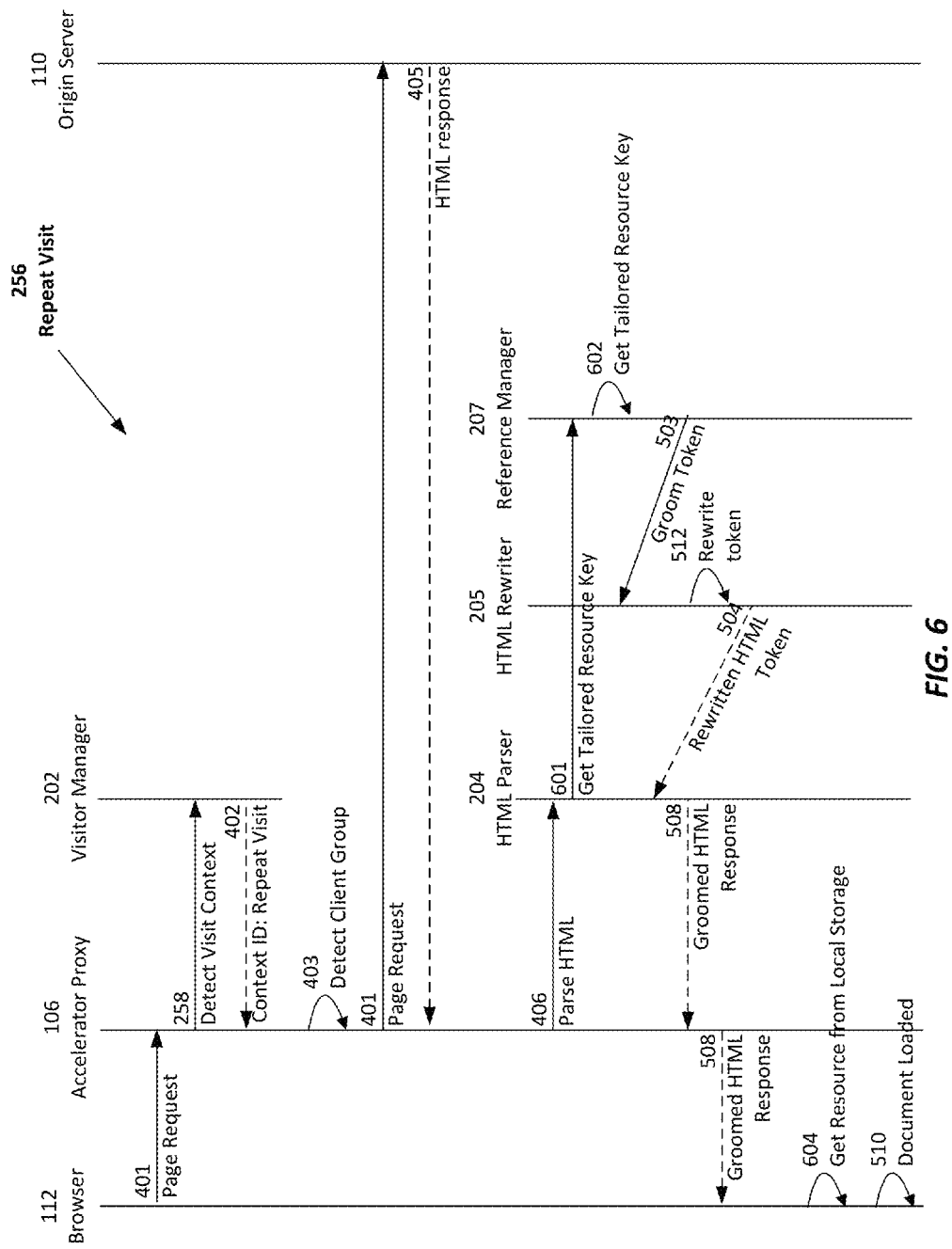
FIG. 6 is a sequence diagram depicting a repeat visit to a primed page according to one embodiment.

Referring now to FIG. 6, there is shown a sequence diagram depicting a repeat visit to a primed page 255 according to one embodiment. The steps illustrated in FIG. 6 are performed, for example, once the steps of FIG. 5 have been performed during a previous visit to the same page. Again, it is assumed that a sufficient number of primer visits to warm up the system have been completed and the system has been primed for the request being handled.

As before, browser 112 issues a page request 401 (such as a request for an HTML page, transmitted via HTTP). Page request 401 is intercepted by accelerator proxy 106. Accelerator proxy 106 issues a detect visit context call 258 to visitor manager 202, which determines the visit context. Visitor manager issues a response including a context ID 402 indicating that the visit is a repeat visit for this browser 112. Further description of the process for determining the visit context is provided herein in connection with FIG. 8.

If appropriate, accelerator proxy 106 also detects 403 the client group 209 associated with page request 401, for example by testing user-agent text included in the request headers.

Accelerator proxy 106 then forwards page request 401 to origin server 110, which in turn provides a response, such as HTML response 405 containing a web page and/or other resources. Accelerator proxy 106 issues a parse HTML call 406 to HTML parser 204 to separate HTML response 405 stream into tokens that contain external resource references. For each such token, HTML parser 204 sends a message 601 to request a tailored resource key corresponding to that token. Reference manager retrieves 602 a tailored resource key and issues a groom token 503 message (containing a token and the tailored resource key), to HTML rewriter 205, instructing HTML rewriter 205 to replace some or all of the original resource locations with tailored resource key references. HTML rewriter 205 rewrites 512 the token to contain the received tailored resource key. These are the same key values used to store the resource content in client-side local storage 111, and they enable client 152 to retrieve the resource content from its local storage 111.

Rewriting 512 is repeated for all tokens in the HTML document. HTML parser 204 provides groomed HTML response 508 to accelerator proxy 106, which transmits it to browser 112. When browser 112 renders the groomed HTML, it retrieves 604 versions of the references from local storage 111, thus improving efficiency of page rendering. In the event that a resource expected to be in local storage 111 is not found, the system falls back to fetching the resource from accelerator proxy 106 or another external location where the original data may be found, and then (optionally) storing it in local storage 111 for later use.

The HTML document is then considered to be loaded 510.

Internal Visit.

In internal visit scenario 257, the requesting web browser 112 has previously visited a page on the same website; thus, some of the resources required by the page may already be present at local storage 111. However, browser 112 has never been to this particular web page before; therefore, a blanket assumption that all resources are in local storage 111 cannot be applied. In at least one embodiment, upon encountering this scenario, accelerator proxy 106 transforms each external resource request on a case-by-case basis. Accelerator proxy 106 keeps track of which common resources are found on which pages. In at least one embodiment, browser 112 passes a cookie that indicates which pages (or page groups) have previously been visited. Thus, accelerator proxy 106 is able to infer, for each external resource reference encountered in the HTML response, whether the resource is already in local storage 111 associated with browser 112. The same client group limits and transformations are applied but on a per-resource basis. As in the other scenarios, resources whose characteristics fall outside of the client group constraints are left unchanged.

In at least one embodiment, to support the transfer of resources from the page to local storage 111 at client 151, a script is inserted into the HTML that runs after the document render has completed. The script code iterates through the document, locating resources flagged for transfer and moving them to local storage 111 using the storage key provided. Alternatively, the transfer can be initiated after each resource has been loaded. In at least one embodiment, as items are stored locally, the space available in local storage 111 is detected and tracked as part of the cookie. This information is used by the system to optionally insert a script whose purpose is to remove items from local storage 111 as well as to adjust the size limit settings.

Figure 7:
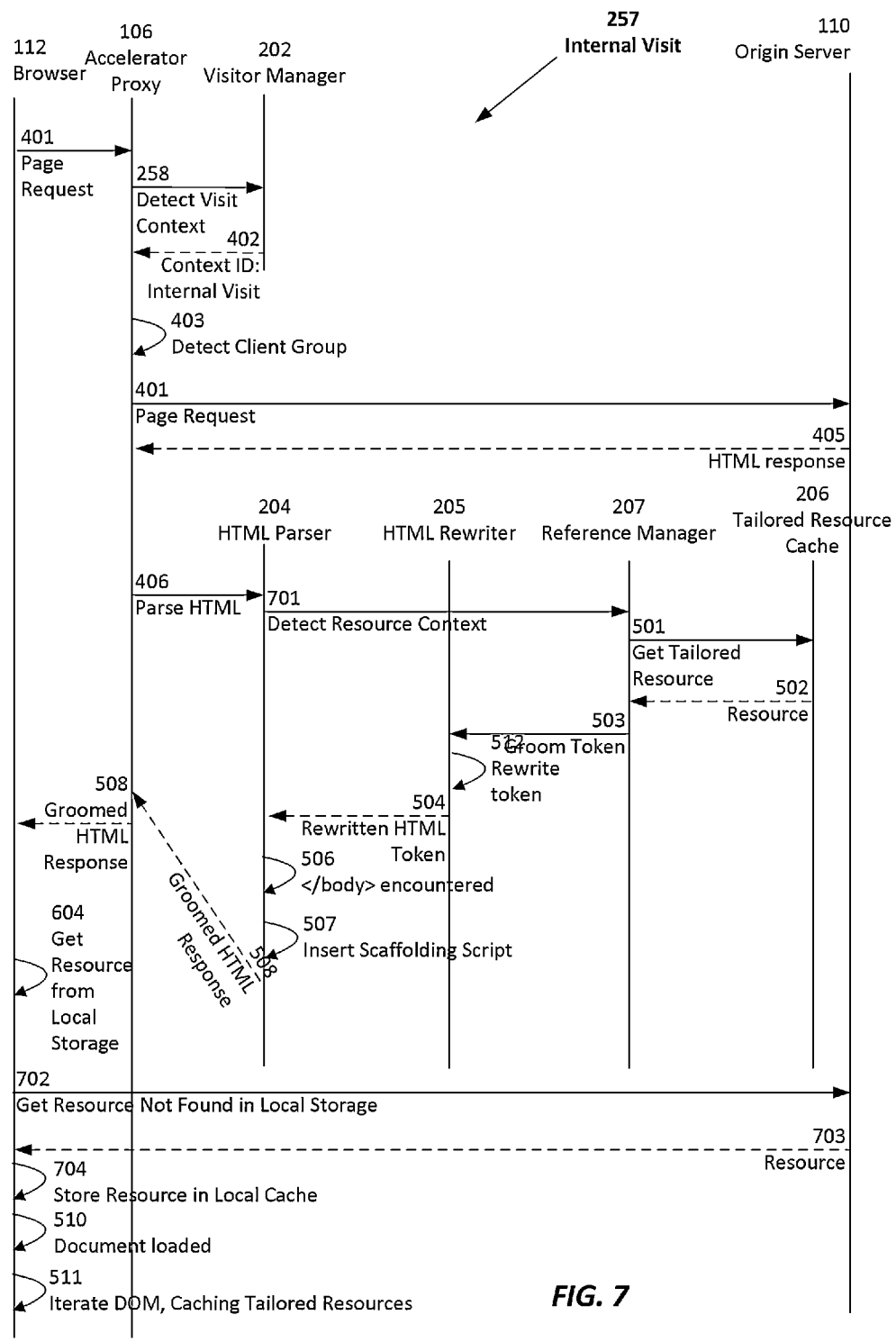
FIG. 7 is a sequence diagram depicting a visit to an internal page according to one embodiment.

Referring now to FIG. 7, there is shown a sequence diagram depicting a visit to an internal page 257 according to one embodiment. The steps illustrated in FIG. 7 are performed, for example, once the steps of FIG. 5 have been performed during a previous visit to the another page in the same website during the same session. Again, it is assumed that a sufficient number of primer visits required to warm up the system have been completed, and the system has been primed for the request being described.

Browser 112 issues a page request 401 (such as a request for an HTML page, transmitted via HTTP). Page request 401 is intercepted by accelerator proxy 106. Accelerator proxy 106 issues a detect visit context call 258 to visitor manager 202, which determines the visit context. Visitor manager issues a response including a context ID 402 indicating that the visit is an internal visit. Further description of the process for determining the visit context is provided herein in connection with FIG. 8.

If appropriate, accelerator proxy 106 also detects 403 the client group 209 associated with page request 401, for example by testing user-agent text included in the request headers.

Accelerator proxy 106 then forwards page request 401 to origin server 110, which in turn provides a response, such as HTML response 405 containing a web page and/or other resources. Accelerator proxy 106 issues a parse HTML call 406 to HTML parser 204 to separate response 405 into tokens contain external resource references. HTML parser issues a detect resource context call 701, which causes reference manager 207 to detect a resource context in order to determine whether client 151 is likely to have the specified resource in local storage 111. The determination can include detecting whether the resource is in a reference map (which may be implemented as data storage used by reference manager 207), and/or whether this page is known to contain this URL, and/or whether the visitor has previously been to a page with the same URL. Based on such determinations, the resource context is detected as either being an unmapped resource, an initially encountered resource, or a resource that has been previously encountered.

If the resource is determined to likely be in local storage 111, then a local cache key version of the resource reference is used. If the resource is not likely to be in local storage 111 and is within the size constraints defined by the client group 209 for in-lined resources (or other such constraints as may configured in the system, for example frequency of use or volatility of the resource), the resource is in-lined; in addition, if the resource is within the constraints defined by the client group 209 for local storage, then an external reference to the tailored resource reference is included, along with scaffolding script as described above for transferring the resource to the client's local storage 111 during or after the rendering process. References to all resources falling outside of the client group 209 constraints are included unchanged. Additional details for resource context detection 701 are provided below in connection with FIG. 9. Accordingly, based on the resource context, reference manager 207 requests 501 and receives 502 a tailored resource from tailored resource cache 206. Tokens may contain external resource references. For each such token, reference manager 207 transmits a groom token call 503 to HTML rewriter 205; HTML rewriter 205 rewrites 512 the token; as described above, depending on the resource context detected in step 701, the token may be rewritten to include an in-lined resource and URL key for local storage of the resource, or it may include the URL key alone. HTML rewriter 205 transmits the rewritten token 504 to HTML parser 204.

Rewriting 512 is repeated for all tokens in the HTML document. In at least one embodiment, HTML parser 204 determines when all tokens have been processed by detection of a </body> token, indicating that the end of the HTML body has been reached. At this point, a scaffolding script is inserted 507, as described above in connection with FIG. 5. In at least one embodiment, the key for each resource stored locally is included with the in-line data and is known by reference manager 207.

When browser 112 renders the groomed HTML, a combination of initial and repeat visit behaviors is performed. Resource references that refer to locally stored items are obtained 604 from local storage 111. In the event a resource is not found in local storage 111, browser 112 requests 702 and receives the resource 703 from origin server 110 or from some other source. Some or all such items are copied 704 to local storage 111.

Browser 112 then recognizes that the document has been loaded 510. In at least one embodiment, in addition to rendering the HTML page, browser 112 iterates 511 through the domain object model (DOM) specified in the HTML response 508 and stores, in local storage 111, tailored resources found therein for future use. Again, in at least one embodiment, the resources are stored using the local storage key discussed above, and the relevant metadata for managing the cache, including cache expiry, is also stored or updated.

Detecting Visit Context 258

Figure 8:
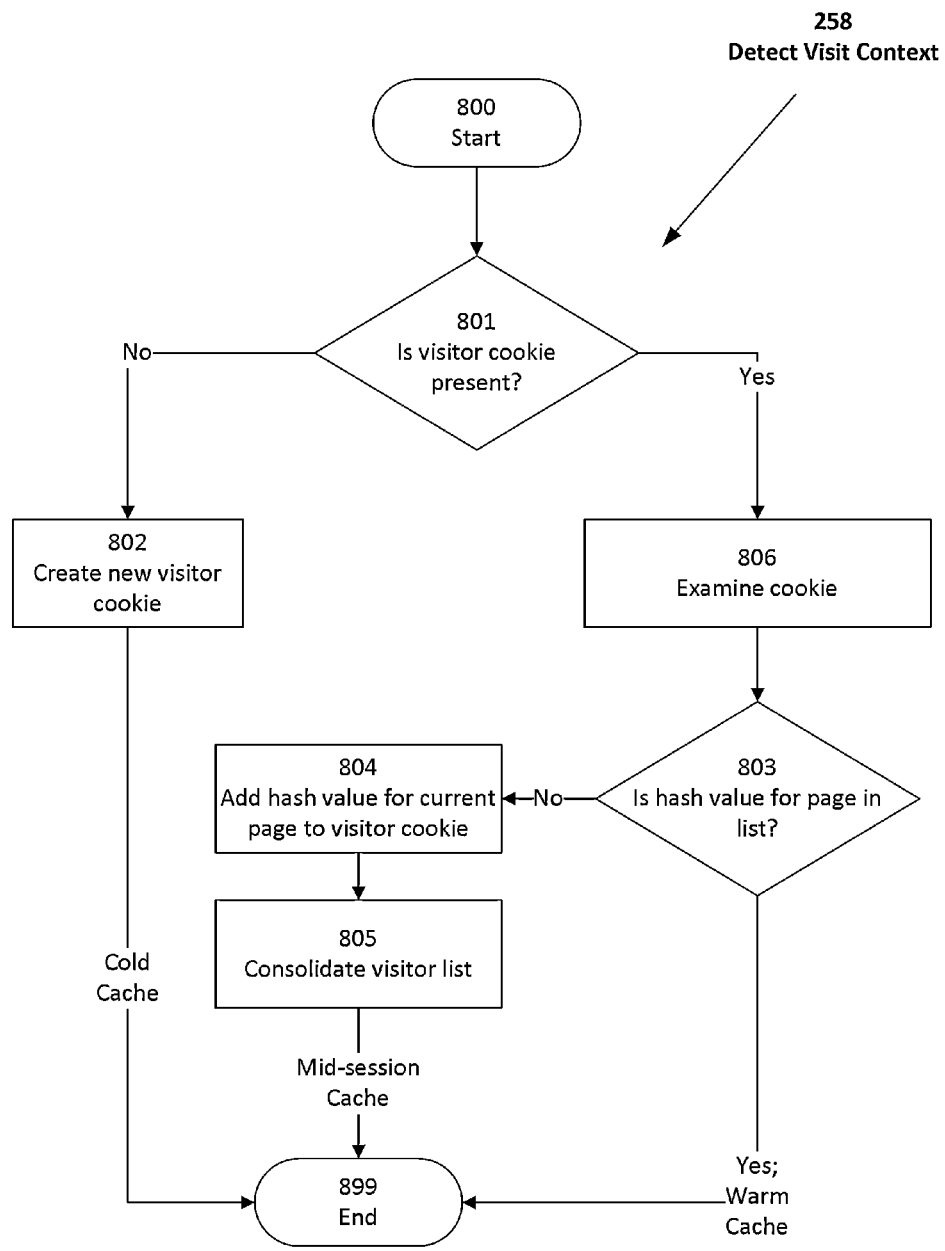
FIG. 8 is a flow diagram depicting a method of detecting visit context according to one embodiment.

Referring now to FIG. 8, there is shown a flow diagram depicting a method of detecting visit context 801 according to one embodiment. The purpose of the method of FIG. 8 is to classify each request into one of the three categories discussed above: initial visit, repeat visit, or internal visit. In at least one embodiment, the context is inferred through the use of a uniquely named HTTP cookie (e.g., a visitor cookie). This cookie includes a list of URL hashes that indicate which pages have been visited by this browser 112. These hashes may be determined, for example, using an MD5 message-digest algorithm, or any other suitable hashing function. In other embodiments, any suitable algorithm or algorithms can be used for encoding such information; an example is a Bloom filter.

In at least one embodiment, the steps of FIG. 8 are performed by visitor manager 202, although one skilled in the art will recognize that the steps can be performed by any suitable component of the system.

The method begins 800. Visitor manager 202 detects 801 whether or not the visitor cookie is present for the given request. If it is not present, visitor manager 202 returns a result category of initial visit (also referred to as a "cold cache"), and a new visitor cookie is created 802.

If the visitor cookie does exist, visitor manager 202 examines 806 the value of the cookie, by determining a hash value of the current page URL and looking 803 for that hash value in the list of URL hashes of the visitor cookie. If, in step 803, the hash value for the current page is found in the visitor cookie's list, meaning that browser 112 has been to this page, then visitor manager 202 returns a result category of repeat visit (also referred to as a "warm cache").

If the visitor cookie exists but the hash value of the current page URL is not in the list of URL hashes of the visitor cookie, then a hash value of the current page URL is added 804 to the list of URL hashes of the visitor cookie, so that future requests for the current page will yield the repeat visit result.

Once the hash value of the current page URL has been added, the cookie is examined for possible consolidation 805 in which groups of pages can be represented by a single hash value. This technique is used to keep the cookie value small, yet still have an accurate record of which resources are in the local cache. One skilled in the art will recognize that other pruning methods may be used for managing the size of the visitor cookie, and that the visitor cookie need not maintain a complete list of visited pages to still be of value to the system.

In general, the presence of a cookie that does not include the current page means that the browser 112 has visited at least one other page in the same website (hence, the presence of the cookie), but has not yet visited this particular page (hence, the absence of a hash value for this particular page in the cookie. Thus, in this case, visitor manager 202 returns a result category of internal visit (also referred to as a "mid-session cache").

The method then ends 899.

Detecting Resource Request Context 701

Figure 9:
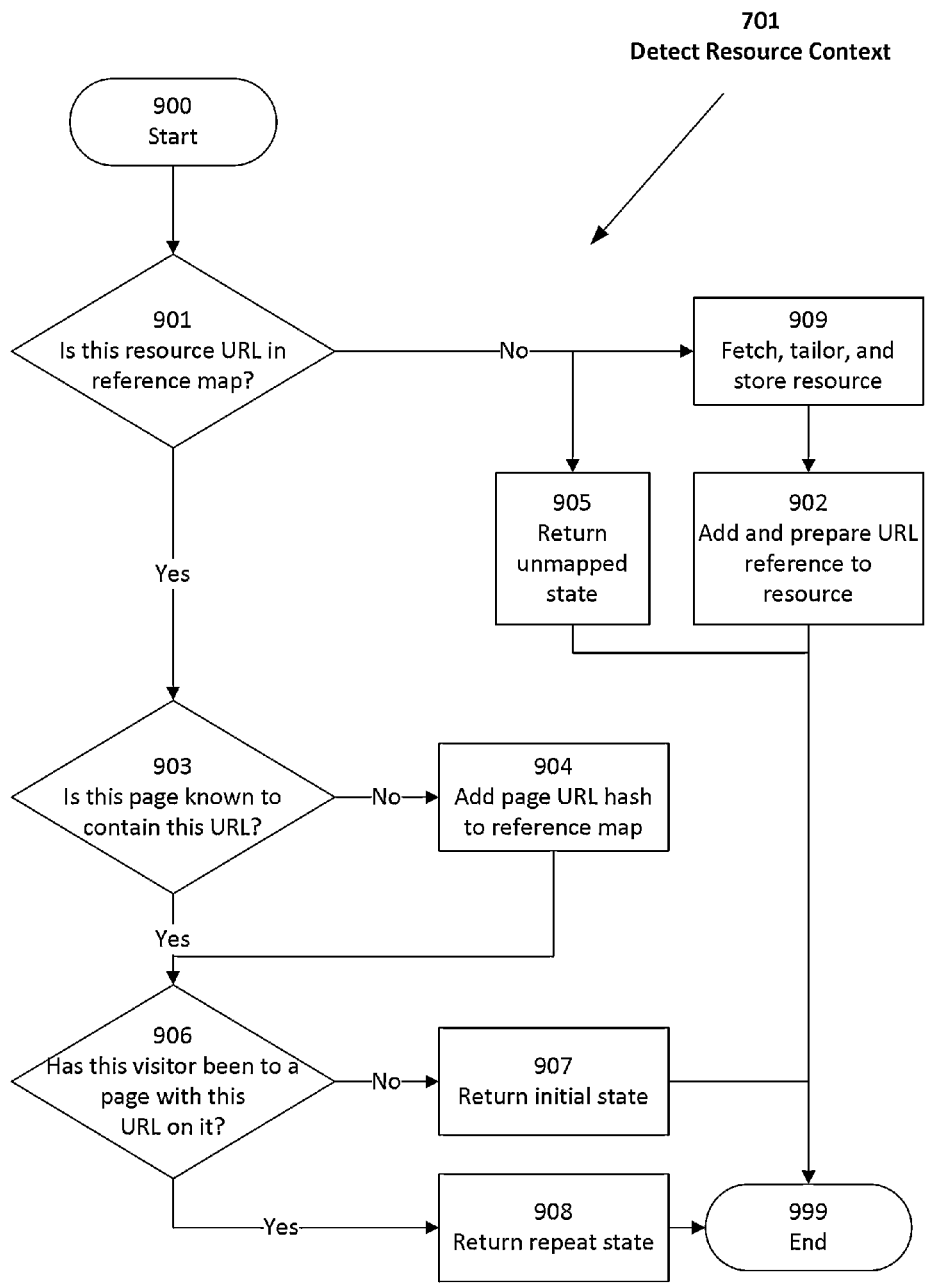
FIG. 9 is a flow diagram depicting a method of detecting resource request context according to one embodiment.

Referring now to FIG. 9, there is shown a flow diagram depicting a method of detecting resource request context 701 according to one embodiment. The purpose of this process is to determine whether or not the requesting browser 112 is likely to have a given resource in its local storage 111.

In at least one embodiment, the steps of FIG. 9 are performed by reference manager 207, although one skilled in the art will recognize that the steps can be performed by any suitable component of the system.

The method begins 900. First, reference manager 207 determines 901 whether the original resource URL can be found in the reference map. If the URL is not found, an unmapped state is detected 905 and is returned. In at least one embodiment, independently of returning the unmapped state, a separate process may fetch, tailor, and then store 909 the resource, and add and prepare 902 a URL reference to that resource so that future queries can find the tailored resource.

If, in step 901, the resource URL is found, steps are performed to map resources to pages and/or to maintain accuracy of such a map. A determination 903 is made as to whether this page is known to contain this URL. If not, a page URL hash is added 904 to the reference map. This step updates the reference found for the resource URL with a value that indicates that it has been found on the particular parent HTML page URL.

A determination 906 is then made as to whether this visitor has been to a page containing the resource URL. This determination 906 may be made, for example, by querying the visitor cookie value, as described above in connection with FIG. 8, to determine which pages the browser 112 has likely previously visited, and cross-referencing that list of pages with a list of pages where reference manager 207 has recorded that the resource was found. If the requesting browser 112 has likely been to a page for which the resource was likely previously transferred to local storage, then the repeat state 908 is returned. If the requesting browser 112 has probably not been to a page known to contain the resource URL, then the initial state 907 is returned.

The method ends 999.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include: a mobile phone, personal digital assistant, smartphone, kiosk, server computer, enterprise computing device, desktop computer, laptop computer, tablet computer, consumer electronic device, television, set-top box, or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for accelerating content presentation in a client/server environment, comprising:
   priming a plurality of web pages by:
      configuring a plurality of client groups;
      tailoring a plurality of resources for use in responding to client requests for the web pages, wherein tailoring a plurality of resources comprises, for at least one resource, tailoring the resource for presentation on clients belonging to one of a the plurality of client groups; and
      storing the tailored resources in a tailored resource cache; and
   at a proxy device communicatively coupled to a client and a server via a communications network, performing the steps of:
      intercepting a request from the client for a web page;
      detecting a client group associated with the requesting client, the client group being one of the client groups in the plurality;
      determining a visit context for the request, the visit context indicating whether the client has previously visited the web page;
      transmitting a request to a server for content requested in the intercepted request;
      receiving a response from the server, the response comprising at least one resource reference;
      parsing the received response to identify the at least one token representing a resource reference;
      responsive to the visit context indicating that the client has not previously visited the web page:
         for each of at least a subset of identified tokens:
            retrieving a tailored resource identified by the resource reference, wherein retrieving a tailored resource comprises retrieving a resource tailored for presentation on clients belonging to the detected client group;
            rewriting the token to include the tailored resource for local storage of the tailored resource and a resource key for retrieval of the tailored resource from local storage; and
         transmitting a groomed response to the client including the rewritten at least one token; and
      responsive to the visit context indicating that the client has previously visited the web page:
         for each of at least a subset of identified tokens:
            obtaining a previously stored tailored resource key identifying a storage location for a resource in local storage associated with the client; and
            rewriting the token to include the resource key for use by the client in retrieving the tailored resource; and
         transmitting a groomed response to the client including the rewritten at least one token.

2. The method of claim 1, further comprising:
   at a client, responsive to receiving a groomed request including at least one token including a resource key, retrieving a resource indexed by the key; and
   at the client, rendering the requested web page including the retrieved resource; and
   at an output device, outputting the rendered web page.

3. The method of claim 1, wherein tailoring a plurality of resources comprises, for at least one resource, performing at least one of:
   compressing the resource;
   removing non-essential characters from the resource; and
   converting the resource from a first encoding scheme to a second encoding scheme.

4. The method of claim 1, wherein each client group comprises a category of clients having a common characteristic.

5. The method of claim 1, wherein detecting a client group comprises performing a user-agent filter query on the intercepted request.

6. The method of claim 1, wherein the requested web page is associated with a website, and wherein the method further comprises:
at the proxy device, responsive to the visit context indicating that the client has previously visited at least one other web page within the website associated with the requested web page:
for each of at least a subset of identified tokens:
determining whether the token references a resource previously stored in local storage associated with the client;
responsive to the token referencing a resource previously stored in local storage associated with the client:
obtaining a previously stored tailored resource key identifying a storage location for the resource in local storage associated with the client; and
rewriting the token to include the resource key for use by the client in retrieving the tailored resource; and
responsive to the token referencing a resource not previously stored in local storage associated with the client:
retrieving a tailored resource identified by the resource reference;
rewriting the token to include the tailored resource for local storage of the tailored resource and a resource key for retrieval of the tailored resource from local storage; and
transmitting a groomed response to the client including the rewritten at least one token.

7. The method of claim 1, wherein the client comprises a mobile device.

8. The method of claim 1, wherein each web page comprises an HTML page.

9. The method of claim 1, wherein rewriting the token to include the tailored resource comprises adding the tailored resource as an in-line embedded resource.

10. The method of claim 1, wherein rewriting the token to include the tailored resource comprises adding a script to cause the client to store the tailored resource in local storage.

11. The method of claim 1, wherein rewriting the token to include a tailored resource comprises:
determining whether the tailored resource falls within a defined constraint; and
responsive to the tailored resource falling within the defined constraint, rewriting the token to include the tailored resource.

12. The method of claim 11, wherein the constraint is defined with reference to a client group.

13. The method of claim 1, wherein rewriting the token to include a tailored resource comprises:
determining whether the tailored resource falls within a defined size constraint;
responsive to the tailored resource falling within the defined size constraint, rewriting the token to include the tailored resource as an in-line embedded resource; and
responsive to the tailored resource not falling within the defined size constraint, rewriting the token to refer to the tailored resource as an external resource.

14. A computer program product for accelerating content presentation in a client/server environment, comprising:
a non-transitory computer-readable storage medium; and
computer program code, encoded on the medium, configured to cause at least one processor at a proxy device communicatively coupled to a client and a server via a communications network to perform the steps of:
priming a plurality of web pages by:
configuring a plurality of client groups;
tailoring a plurality of resources for use in responding to client requests for the web pages, wherein tailoring a plurality of resources comprises, for at least one resource, tailoring the resource for presentation on clients belonging to the plurality of client groups; and
storing the tailored resources in a tailored resource cache; and
at a proxy device communicatively coupled to a client and a server via a communications network, performing the steps of:
intercepting a request from the client for a web page;
detecting a client group associated with the requesting client, the client group being one of the client groups in the plurality;
determining a visit context for the request, the visit context indicating whether the client has previously visited the web page;
transmitting a request to a server for content requested in the intercepted request;
receiving a response from the server, the response comprising at least one resource reference;
parsing the received response to identify the at least one token representing a resource reference;
responsive to the visit context indicating that the client has not previously visited the web page:
for each of at least a subset of identified tokens:
retrieving a tailored resource identified by the resource reference, wherein retrieving a tailored resource comprises retrieving a resource tailored for presentation on clients belonging to the detected client group;
rewriting the token to include the tailored resource for local storage of the tailored resource and a resource key for retrieval of the tailored resource from local storage; and
transmitting a groomed response to the client including the rewritten at least one token; and
responsive to the visit context indicating that the client has previously visited the web page:
for each of at least a subset of identified tokens:
obtaining a previously stored tailored resource key identifying a storage location for a resource in local storage associated with the client; and
rewriting the token to include the resource key for use by the client in retrieving the tailored resource; and
transmitting a groomed response to the client including the rewritten at least one token.

15. The computer program product of claim 14, wherein the groomed response is configured to cause a client to perform the steps of:
responsive to receiving a groomed request including at least one token including a resource key, retrieving a resource indexed by the key;
rendering the requested web page including the retrieved resource; and
causing an output device to output the rendered web page.

16. The computer program product of claim 14, wherein the computer program code configured to cause at least one processor to tailor a plurality of resources comprises computer program code configured to cause at least one processor to, for at least one resource, perform at least one of:
compressing the resource;
removing non-essential characters from the resource; and converting the resource from a first encoding scheme to a second encoding scheme.

17. The computer program product of claim 14, wherein each client group comprises a category of clients having a common characteristic.

18. The computer program product of claim 14, wherein the computer program code configured to cause at least one processor to detect a client group comprises computer program code configured to cause at least one processor to perform a user-agent filter query on the intercepted request.

19. The computer program product of claim 14, wherein the requested web page is associated with a website, and wherein the computer program product further comprises computer program code configured to cause at least one processor at the proxy device to perform the steps of:
  responsive to the visit context indicating that the client has previously visited at least one other web page within the website associated with the requested web page:
    for each of at least a subset of identified tokens:
      determining whether the token references a resource previously stored in local storage associated with the client;
      responsive to the token referencing a resource previously stored in local storage associated with the client:
        obtaining a previously stored tailored resource key identifying a storage location for the resource in local storage associated with the client; and
        rewriting the token to include the resource key for use by the client in retrieving the tailored resource; and
      responsive to the token referencing a resource not previously stored in local storage associated with the client:
        retrieving a tailored resource identified by the resource reference;
        rewriting the token to include the tailored resource for local storage of the tailored resource and a resource key for retrieval of the tailored resource from local storage; and
        transmitting a groomed response to the client including the rewritten at least one token.

20. The computer program product of claim 14, wherein the client comprises a mobile device.

21. The computer program product of claim 14, wherein each web page comprises an HTML page.

22. The computer program product of claim 14, wherein the computer program code configured to cause at least one processor to rewrite the token to include the tailored resource comprises computer program code configured to cause at least one processor to add the tailored resource as an in-line embedded resource.

23. The computer program product of claim 14, wherein the computer program code configured to cause at least one processor to rewrite the token to include the tailored resource comprises computer program code configured to cause at least one processor to add a script to cause the client to store the tailored resource in local storage.

24. The computer program product of claim 14, wherein the computer program code configured to cause at least one processor to add rewrite a token to include a tailored resource comprises computer program code configured to cause at least one processor to perform the steps of:
  determining whether the tailored resource falls within a defined constraint; and
  responsive to the tailored resource falling within the defined constraint, rewriting the token to include the tailored resource.

25. The computer program product of claim 24, wherein the constraint is defined with reference to a client group.

26. The computer program product of claim 14, wherein the computer program code configured to cause at least one processor to add rewrite a token to include a tailored resource comprises computer program code configured to cause at least one processor to perform the steps of:
  determining whether the tailored resource falls within a defined size constraint;
  responsive to the tailored resource falling within the defined size constraint, rewriting the token to include the tailored resource as an in-line embedded resource; and
  responsive to the tailored resource not falling within the defined size constraint, rewriting the token to refer to the tailored resource as an external resource.

27. A system for accelerating content presentation in a client/server environment, comprising:
  a tailored resource cache; and
  a proxy device, communicatively coupled to the tailored resource cache and to a client and a server via a communications network, the proxy device configured to:
    prime a plurality of web pages by:
      configuring a plurality of client groups;
      tailoring a plurality of resources for use in responding to client requests for the web pages, wherein tailoring a plurality of resources comprises, for at least one resource, tailoring the resource for presentation on clients belonging to the plurality of client groups; and
      storing the tailored resources in a tailored resource cache; and
    intercept a request from the client for a web page;
    detect a client group associated with the requesting client, the client group being one of the client groups in the plurality;
    determine a visit context for the request, the visit context indicating whether the client has previously visited the web page;
    transmit a request to a server for content requested in the intercepted request;
    receive a response from the server, the response comprising at least one resource reference;
    parse the received response to identify the at least one token representing a resource reference;
    responsive to the visit context indicating that the client has not previously visited the web page:
      for each of at least a subset of identified tokens:
        retrieve a tailored resource identified by the resource reference, wherein retrieving a tailored resource comprises retrieving a resource tailored for presentation on clients belonging to the detected client group;
        rewrite the token to include the tailored resource for local storage of the tailored resource and a resource key for retrieval of the tailored resource from local storage; and
        transmit a groomed response to the client including the rewritten at least one token; and
    responsive to the visit context indicating that the client has previously visited the web page:
      for each of at least a subset of identified tokens:
        obtain a previously stored tailored resource key identifying a storage location for a resource in local storage associated with the client; and
        rewrite the token to include the resource key for use by the client in retrieving the tailored resource; and transmit a groomed response to the client including the rewritten at least one token.

28. The system of claim 27, wherein the groomed response is configured to cause a client to perform the steps of:
responsive to receiving a groomed request including at least one token including a resource key, retrieving a resource indexed by the key;
rendering the requested web page including the retrieved resource; and
causing an output device to output the rendered web page.

29. The system of claim 27, wherein the proxy device is configured to tailor a plurality of resources by, for at least one resource, performing at least one of:
compressing the resource;
removing non-essential characters from the resource; and
converting the resource from a first encoding scheme to a second encoding scheme.

30. The system of claim 27, wherein each client group comprises a category of clients having a common characteristic.

31. The system of claim 27, wherein the proxy device is configured to detect a client group by performing a user-agent filter query on the intercepted request.

32. The system of claim 27, wherein the requested web page is associated with a website, and wherein the proxy device is further configured to:
responsive to the visit context indicating that the client has previously visited at least one other web page within the website associated with the requested web page:
for each of at least a subset of identified tokens:
determine whether the token references a resource previously stored in local storage associated with the client;
responsive to the token referencing a resource previously stored in local storage associated with the client:
obtain a previously stored tailored resource key identifying a storage location for the resource in local storage associated with the client; and
rewrite the token to include the resource key for use by the client in retrieving the tailored resource; and
responsive to the token referencing a resource not previously stored in local storage associated with the client:
retrieve a tailored resource identified by the resource reference;
rewrite the token to include the tailored resource for local storage of the tailored resource and a resource key for retrieval of the tailored resource from local storage; and
transmit a groomed response to the client including the rewritten at least one token.

33. The system of claim 27, wherein the client comprises a mobile device.

34. The system of claim 27, wherein each web page comprises an HTML page.

35. The system of claim 27, wherein the proxy device is configured to rewrite the token to include the tailored resource by adding the tailored resource as an in-line embedded resource.

36. The system of claim 27, wherein the proxy device is configured to rewrite the token to include the tailored resource by adding a script to cause the client to store the tailored resource in local storage.

37. The system of claim 27, wherein the proxy device is configured to rewrite the token to include a tailored resource by:
determining whether the tailored resource falls within a defined constraint; and
responsive to the tailored resource falling within the defined constraint, rewriting the token to include the tailored resource.

38. The system of claim 37, wherein the constraint is defined with reference to a client group.

39. The system of claim 27, wherein the proxy device is configured to rewrite the token to include a tailored resource by:
determining whether the tailored resource falls within a defined size constraint;
responsive to the tailored resource falling within the defined size constraint, rewriting the token to include the tailored resource as an in-line embedded resource; and
responsive to the tailored resource not falling within the defined size constraint, rewriting the token to refer to the tailored resource as an external resource.

* * * * *